United States Patent
Wyatt

(10) Patent No.: US 12,505,423 B2
(45) Date of Patent: Dec. 23, 2025

(54) MULTI-FUNCTION SMART TOKENIZING ELECTRONIC PAYMENT DEVICE

(71) Applicant: Cardware, Inc., Austin, TX (US)

(72) Inventor: David Wyatt, Austin, TX (US)

(73) Assignee: Cardware, Inc., Austin, TX (US)

( * ) Notice: Subject to any disclaimer, the term of this patent is extended or adjusted under 35 U.S.C. 154(b) by 0 days.

(21) Appl. No.: 18/125,624

(22) Filed: Mar. 23, 2023

(65) Prior Publication Data
US 2023/0298000 A1   Sep. 21, 2023

Related U.S. Application Data

(60) Continuation of application No. 17/528,073, filed on Nov. 16, 2021, now Pat. No. 11,620,634, which is a
(Continued)

(51) Int. Cl.
*G06Q 20/34* (2012.01)
*G06K 19/06* (2006.01)
(Continued)

(52) U.S. Cl.
CPC ..... *G06Q 20/341* (2013.01); *G06K 19/06206* (2013.01); *G06K 19/0716* (2013.01);
(Continued)

(58) Field of Classification Search
CPC .... G06Q 20/341; G06Q 20/06; G06Q 20/065; G06Q 20/223; G06Q 20/24;
(Continued)

(56) References Cited

U.S. PATENT DOCUMENTS

| 4,614,861 A | 9/1986 | Pavlov et al. |
| 4,650,978 A | 3/1987 | Hudson et al. |
| (Continued) | | |

FOREIGN PATENT DOCUMENTS

| AU | 2013209318 | 2/2014 |
| CN | 101523417 A | 9/2009 |
| (Continued) | | |

OTHER PUBLICATIONS

U.S. Appl. No. 09/619,859 Application Filed; Date Unknown.
(Continued)

*Primary Examiner* — Seung H Lee

(57) ABSTRACT

An embodiment includes a multi-function electronic device capable of generating a programmed magnetic field of alternating polarity based on a speed of a card swipe, and methods for constructing the device for the purpose of emulating a standard credit card. An apparatus is described to allow the device to emulate behavior of a credit card when used in electronic credit card readers. Additionally, methods are described to allow user control of the device for the purpose of authorizing or controlling use of the device in the application of credit, debit and cash transactions, including cryptocurrency and device-to-device transactions. Methods are also described for generating a limited-duration payment number when performing a transaction for the purpose of creating a limited-use payment number, which is limited in scope of use to a predetermined number of authorized transactions. Furthermore the device may interact with other similar devices in proximity for the purpose of funds or credit/debit transfers.

23 Claims, 7 Drawing Sheets

Related U.S. Application Data continuation of application No. 17/075,637, filed on Oct. 20, 2020, now Pat. No. 11,176,538, which is a continuation of application No. 16/459,150, filed on Jul. 1, 2019, now Pat. No. 10,810,579, which is a continuation of application No. 15/701,261, filed on Sep. 11, 2017, now Pat. No. 10,339,520, which is a continuation of application No. 14/981,757, filed on Dec. 28, 2015, now Pat. No. 9,760,884, which is a continuation of application No. 14/680,979, filed on Apr. 7, 2015, now Pat. No. 9,224,083, which is a division of application No. 14/217,261, filed on Mar. 17, 2014, now Pat. No. 9,022,286.

(60) Provisional application No. 61/794,891, filed on Mar. 15, 2013.

(51) Int. Cl.
| | |
|---|---|
| *G06K 19/07* | (2006.01) |
| *G06K 19/077* | (2006.01) |
| *G06Q 20/06* | (2012.01) |
| *G06Q 20/22* | (2012.01) |
| *G06Q 20/24* | (2012.01) |
| *G06Q 20/38* | (2012.01) |
| *G06Q 20/40* | (2012.01) |
| *G07F 7/08* | (2006.01) |
| *G07F 19/00* | (2006.01) |

(52) U.S. Cl.
CPC ....... *G06K 19/07749* (2013.01); *G06Q 20/06* (2013.01); *G06Q 20/065* (2013.01); *G06Q 20/223* (2013.01); *G06Q 20/24* (2013.01); *G06Q 20/346* (2013.01); *G06Q 20/347* (2013.01); *G06Q 20/352* (2013.01); *G06Q 20/3827* (2013.01); *G06Q 20/385* (2013.01); *G06Q 20/4012* (2013.01); *G06Q 20/409* (2013.01); *G07F 7/0873* (2013.01); *G07F 19/00* (2013.01)

(58) Field of Classification Search
CPC .. G06Q 20/346; G06Q 20/347; G06Q 20/352; G06Q 20/3827; G06Q 20/385; G06Q 20/4012; G06Q 20/409; G06K 19/06206; G06K 19/0716; G06K 19/07749; G07F 7/0873; G07F 19/00
See application file for complete search history.

(56) References Cited

U.S. PATENT DOCUMENTS

| | | |
|---|---|---|
| 4,868,376 A | 9/1989 | Lessin et al. |
| 5,317,636 A | 5/1994 | Vizcaino |
| 5,528,222 A | 6/1996 | Moskowitz et al. |
| 5,594,233 A | 1/1997 | Kenneth et al. |
| 5,744,787 A | 4/1998 | Teicher |
| 5,818,030 A | 10/1998 | Reyes |
| 5,883,810 A | 3/1999 | Franklin et al. |
| 5,903,721 A | 5/1999 | Sixtus |
| 5,913,203 A | 6/1999 | Wong et al. |
| 5,937,394 A | 8/1999 | Wong |
| 5,956,699 A | 9/1999 | Wong et al. |
| 5,963,924 A | 10/1999 | Williams et al. |
| 6,005,942 A | 12/1999 | Chan et al. |
| 6,012,636 A | 1/2000 | Smith |
| 6,076,075 A | 6/2000 | Teicher |
| 6,105,008 A | 8/2000 | Davis et al. |
| 6,119,946 A | 9/2000 | Teicher |
| 6,233,683 B1 | 5/2001 | Chan et al. |
| 6,282,522 B1 | 8/2001 | Davis et al. |
| 6,330,978 B1 | 12/2001 | Molano et al. |
| 6,450,407 B1 | 9/2002 | Freeman et al. |
| 6,481,632 B2 | 11/2002 | Wentker et al. |
| 6,592,044 B1 | 7/2003 | Wong et al. |
| 6,609,654 B1 | 8/2003 | Anderson et al. |
| 6,748,367 B1 | 6/2004 | Lee et al. |
| 6,755,341 B1 | 6/2004 | Wong et al. |
| 6,776,332 B2 | 8/2004 | Allen et al. |
| 6,938,484 B2 | 9/2005 | Najafi et al. |
| 7,004,385 B1 | 2/2006 | Douglass |
| 7,127,236 B2 | 10/2006 | Khan et al. |
| 7,177,848 B2 | 2/2007 | Hogan et al. |
| 7,258,012 B2 | 8/2007 | Xie |
| 7,280,096 B2 | 10/2007 | Marvit |
| 7,580,898 B2 | 8/2009 | Brown et al. |
| 7,593,000 B1 | 9/2009 | Chin |
| 7,725,369 B2 | 5/2010 | Shiftan et al. |
| 7,740,168 B2 | 6/2010 | Hammad et al. |
| 7,793,851 B2 | 9/2010 | Mullen |
| 7,907,838 B2 | 3/2011 | Nasiri |
| 7,908,216 B1 | 3/2011 | Davis et al. |
| 7,954,724 B2 | 6/2011 | Poidomani et al. |
| 8,052,052 B1 | 11/2011 | Power |
| 8,095,113 B2 | 1/2012 | Kean et al. |
| 8,103,588 B2 | 1/2012 | Patterson |
| 8,127,999 B2 | 3/2012 | Diamond |
| 8,226,001 B1 | 7/2012 | Foo et al. |
| 8,231,063 B2 | 7/2012 | Poidomani et al. |
| 8,255,323 B1 | 8/2012 | Casey et al. |
| 8,286,889 B2 | 10/2012 | Poidomani et al. |
| 8,302,871 B2 | 11/2012 | Poidomani et al. |
| 8,317,103 B1 | 11/2012 | Foo et al. |
| 8,341,557 B2 | 12/2012 | Pisula et al. |
| 8,351,910 B2 | 1/2013 | Horodezky et al. |
| 8,360,332 B2 | 1/2013 | Poidomani et al. |
| 8,423,462 B1 | 4/2013 | Amacker et al. |
| 8,480,002 B2 | 7/2013 | Poidomani et al. |
| 8,500,019 B2 | 8/2013 | Poidomani et al. |
| 8,540,165 B2 | 9/2013 | Foo et al. |
| 8,646,059 B1 | 2/2014 | Von Behren et al. |
| 8,678,276 B2 | 3/2014 | Poidomani et al. |
| 8,684,267 B2 | 4/2014 | Foo et al. |
| 8,763,916 B1 | 7/2014 | Foo et al. |
| 8,892,390 B2 | 11/2014 | MacGougan et al. |
| 8,909,138 B2 | 12/2014 | Rhelimi |
| 8,930,274 B1 | 1/2015 | Brickell et al. |
| 8,952,832 B2 | 2/2015 | Nasiri et al. |
| 9,008,616 B2 | 4/2015 | Wall et al. |
| 9,053,399 B2 | 6/2015 | Foo et al. |
| 9,256,871 B2 | 2/2016 | Anderson et al. |
| 9,390,442 B2* | 7/2016 | Lyle .................. G06Q 20/3227 |
| 9,600,808 B1 | 3/2017 | Gomez, Sr. et al. |
| 9,619,741 B1 | 4/2017 | Rigatti |
| 9,721,319 B2 | 8/2017 | Smets et al. |
| 9,898,728 B2 | 2/2018 | Brudnicki et al. |
| 10,121,144 B2 | 11/2018 | Khan |
| 10,181,121 B2 | 1/2019 | Roberts et al. |
| 10,380,573 B2 | 8/2019 | Lin et al. |
| 10,445,723 B2 | 10/2019 | Laracey |
| 10,510,056 B2 | 12/2019 | Carter et al. |
| 10,628,820 B2 | 4/2020 | Wyatt |
| 11,042,846 B2 | 6/2021 | Dicker et al. |
| 11,068,875 B2 | 7/2021 | Khan et al. |
| 11,176,538 B2 | 11/2021 | Wyatt |
| 11,328,286 B2 | 5/2022 | Wyatt |
| 11,392,937 B2 | 7/2022 | Dicker et al. |
| 11,620,634 B2 | 4/2023 | Wyatt |
| 2002/0096570 A1 | 7/2002 | Wong et al. |
| 2002/0174075 A1 | 11/2002 | Mirlas et al. |
| 2003/0222152 A1 | 12/2003 | Boley, Jr. |
| 2004/0127256 A1 | 7/2004 | Goldthwaite et al. |
| 2005/0043997 A1 | 2/2005 | Sahota et al. |
| 2005/0252961 A1 | 11/2005 | Rasti |
| 2006/0097991 A1 | 5/2006 | Hotelling et al. |
| 2006/0122931 A1 | 6/2006 | Walker et al. |
| 2006/0186195 A1 | 8/2006 | Gray |
| 2007/0034700 A1 | 2/2007 | Poidomani et al. |
| 2007/0045403 A1 | 3/2007 | Slonecker, Jr. |
| 2007/0055630 A1 | 3/2007 | Gauthier et al. |
| 2007/0076923 A1 | 4/2007 | Chiu |

(56) References Cited

U.S. PATENT DOCUMENTS

| | | |
|---|---|---|
| 2007/0095892 A1 | 5/2007 | Lyons et al. |
| 2007/0114274 A1 | 5/2007 | Gibbs et al. |
| 2007/0208671 A1 | 9/2007 | Brown et al. |
| 2007/0244811 A1 | 10/2007 | Tumminaro |
| 2007/0265984 A1 | 11/2007 | Santhana |
| 2007/0278291 A1 | 12/2007 | Rans et al. |
| 2008/0017704 A1 | 1/2008 | VanDeburg et al. |
| 2008/0040285 A1 | 2/2008 | Wankmueller |
| 2008/0078831 A1 | 4/2008 | Johnson et al. |
| 2008/0110983 A1 | 5/2008 | Ashfield |
| 2008/0121687 A1* | 5/2008 | Buhot ............... G06Q 20/3278 235/375 |
| 2008/0122796 A1 | 5/2008 | Jobs et al. |
| 2008/0148394 A1 | 6/2008 | Poidomani et al. |
| 2008/0172317 A1 | 7/2008 | Deibert et al. |
| 2008/0222047 A1 | 9/2008 | Boalt |
| 2008/0275779 A1 | 11/2008 | Lakshminarayanan |
| 2008/0319905 A1 | 12/2008 | Carlson |
| 2009/0030845 A1 | 1/2009 | Hurry et al. |
| 2009/0070272 A1 | 3/2009 | Jain |
| 2009/0083850 A1 | 3/2009 | Fadell et al. |
| 2009/0144161 A1 | 6/2009 | Fisher |
| 2009/0200371 A1 | 8/2009 | Kean et al. |
| 2009/0210308 A1 | 8/2009 | Toomer et al. |
| 2009/0276347 A1 | 11/2009 | Kargman |
| 2009/0291634 A1 | 11/2009 | Saarisalo |
| 2009/0307132 A1 | 12/2009 | Phillips |
| 2009/0320123 A1 | 12/2009 | Yu et al. |
| 2010/0078471 A1 | 4/2010 | Lin et al. |
| 2010/0078472 A1 | 4/2010 | Lin et al. |
| 2010/0082481 A1 | 4/2010 | Lin et al. |
| 2010/0082490 A1 | 4/2010 | Rosenblatt et al. |
| 2010/0088227 A1 | 4/2010 | Belamant |
| 2010/0125508 A1 | 5/2010 | Smith |
| 2010/0125509 A1 | 5/2010 | Kranzley et al. |
| 2010/0127083 A1 | 5/2010 | Brown et al. |
| 2010/0185545 A1 | 7/2010 | Royyuru et al. |
| 2010/0217709 A1 | 8/2010 | Aabye et al. |
| 2011/0010277 A1 | 1/2011 | Enzaldo |
| 2011/0022472 A1 | 1/2011 | Zon |
| 2011/0070826 A1 | 3/2011 | Griffin et al. |
| 2011/0078031 A1 | 3/2011 | Mardikar et al. |
| 2011/0082772 A1 | 4/2011 | Hirson |
| 2011/0101093 A1 | 5/2011 | Ehrensvärd |
| 2011/0112918 A1 | 5/2011 | Mestréet al. |
| 2011/0140841 A1 | 6/2011 | Bona et al. |
| 2011/0153498 A1 | 6/2011 | Makhotin et al. |
| 2011/0173060 A1 | 7/2011 | Gallagher |
| 2011/0173121 A1 | 7/2011 | Kawan |
| 2011/0184867 A1 | 7/2011 | Varadarajan |
| 2011/0191161 A1 | 8/2011 | Dai |
| 2011/0191177 A1 | 8/2011 | Blackhurst et al. |
| 2011/0238573 A1 | 9/2011 | Varadarajan |
| 2011/0282785 A1 | 11/2011 | Chin |
| 2012/0011058 A1 | 1/2012 | Pitroda et al. |
| 2012/0116902 A1 | 5/2012 | Cardina et al. |
| 2012/0116976 A1 | 5/2012 | Cardina et al. |
| 2012/0123937 A1 | 5/2012 | Spodak |
| 2012/0143754 A1 | 6/2012 | Patel |
| 2012/0148115 A1 | 6/2012 | Birdwell et al. |
| 2012/0150687 A1 | 6/2012 | Hart |
| 2012/0150750 A1 | 6/2012 | Law |
| 2012/0169593 A1 | 7/2012 | Mak et al. |
| 2012/0191612 A1 | 7/2012 | Spodak et al. |
| 2012/0191615 A1 | 7/2012 | Shibuk |
| 2012/0197691 A1 | 8/2012 | Grigg et al. |
| 2012/0205443 A1 | 8/2012 | Routhenstein et al. |
| 2012/0206406 A1 | 8/2012 | Kim et al. |
| 2012/0290449 A1 | 11/2012 | Mullen et al. |
| 2012/0310760 A1 | 12/2012 | Phillips et al. |
| 2013/0013499 A1 | 1/2013 | Kalgi |
| 2013/0024371 A1 | 1/2013 | Harraman et al. |
| 2013/0036050 A1 | 2/2013 | Gordano et al. |
| 2013/0054474 A1 | 2/2013 | Yeager |
| 2013/0068366 A1 | 3/2013 | Eng |
| 2013/0087627 A1 | 4/2013 | Marseille et al. |
| 2013/0097040 A1 | 4/2013 | Fisher |
| 2013/0151292 A1 | 6/2013 | Van Deloo et al. |
| 2013/0159186 A1 | 6/2013 | Brudnicki et al. |
| 2013/0166441 A1 | 6/2013 | Kobylkin et al. |
| 2013/0232083 A1 | 9/2013 | Smith et al. |
| 2013/0262317 A1 | 10/2013 | Collinge et al. |
| 2013/0297509 A1 | 11/2013 | Sebastian et al. |
| 2014/0006276 A1 | 1/2014 | Grigg et al. |
| 2014/0019367 A1 | 1/2014 | Khan et al. |
| 2014/0229375 A1 | 8/2014 | Zaytzsev et al. |
| 2014/0310113 A1 | 10/2014 | Sengupta et al. |
| 2014/0344153 A1 | 11/2014 | Raj et al. |
| 2015/0058191 A1 | 2/2015 | Khan et al. |
| 2015/0073983 A1 | 3/2015 | Bartenstein et al. |
| 2015/0134540 A1 | 5/2015 | Law et al. |
| 2015/0178724 A1 | 6/2015 | Ngo et al. |
| 2015/0180836 A1 | 6/2015 | Wong et al. |
| 2015/0348002 A1 | 12/2015 | Van Os et al. |
| 2016/0042356 A1 | 2/2016 | Jakobson et al. |
| 2016/0057619 A1 | 2/2016 | Lopez |
| 2016/0104153 A1 | 4/2016 | Anderson et al. |
| 2016/0253669 A1 | 9/2016 | Yoon et al. |
| 2016/0275505 A1 | 9/2016 | Salian et al. |
| 2016/0321653 A1 | 11/2016 | Jacobs et al. |

FOREIGN PATENT DOCUMENTS

| | | |
|---|---|---|
| EP | 0949595 | 10/1999 |
| EP | 1 004 992 | 5/2000 |
| EP | 1 223 565 | 7/2002 |
| EP | 2 302 882 | 3/2011 |
| EP | 2 407 919 | 1/2012 |
| JP | 2004-13728 | 1/2004 |
| KR | 20110039946 | 4/2011 |
| KR | 20120076502 | 7/2012 |
| WO | 94/17498 | 8/1994 |
| WO | 2001088659 A2 | 11/2001 |
| WO | 2006105092 A2 | 10/2006 |
| WO | 2006116772 A2 | 11/2006 |
| WO | 2009082760 | 7/2009 |
| WO | 2010/037218 A1 | 4/2010 |
| WO | 2010/039337 | 4/2010 |
| WO | 2012/011054 | 1/2012 |
| WO | 2012/042262 | 4/2012 |
| WO | 2012/154915 | 11/2012 |
| WO | 2013/155627 | 10/2013 |

OTHER PUBLICATIONS

U.S. Appl. No. 09/640,044 Application Filed; Date Unknown.
U.S. Appl. No. 09/659,434 Application Filed; Date Unknown.
U.S. Appl. No. 09/667,089 Application Filed; Date Unknown.
U.S. Appl. No. 09/667,082 Application Filed; Date Unknown.
U.S. Appl. No. 09/667,038 Application Filed; Date Unknown.
U.S. Appl. No. 09/667,081 Application Filed; Date Unknown.
U.S. Appl. No. 09/667,835 Application Filed; Date Unknown.
Vedat Coskun, Near Field Communication: Theory To Practice (John Wiley & Sons, 1st ed. 2012); 31 pages.
60884089_Hammad; Provisional Application; Title: Authentication Using Multiple Components.
The 2013 Federal Reserve Payments Study; Recent and Long-Term Trends in the United States: 2000-2012 Detailed Report and Updated Data Release; Federal Reserve System; Jul. 2014; 191 Pages.
The 2013 Federal Reserve Payments Study; Recent and Long-Term Payment Trends in the United States: 2003 - 2012; Summary Report and Initial Data Release;43 Pages.
Over-the-air Deployment of Applications in Multi-Platform Environments; Tore Fjellheim; Queensland University of Technology,2006 Australian Software Engineering Conference; 10 Pages.
Chapter 12: Hash Functions-The Joy of Cryptography OE (1st); 2017; 23 Pages.
This Month in History: The First CreditCard; By Diane Mclaughlin; Banker & Tradesman Staff | Sep. 25, 2022; 2 Pages.
Consumer World; Two Months After the Deadline, Most Major Retailers Still Can't Read Chipped Credit Cards; Dec. 7, 2015; 1 page.

(56) References Cited

OTHER PUBLICATIONS

Tech; Bump Pay Lets you PayPal Someone With A Tap, But Only In-Person; Josh Constine; Mar. 29, 2012; 1 Pages.
Colnect; Bank Card: Bank of America; 2003-2025 colnect.com. 4 Pages.
Visa Token Service—Product Fact Sheet 2022 Visa; 2 pages.
Visa Token Service—Visa 2025; 7 pages.
Visa Token Service Momentum, Annual Update 2022; Visa; 2 pages.
What is Venmo, how does it work, and is it safe to use? May 31, 2024 Ben Luthi Yahoo Finance; 6 pages.
What is Venmo: How it Works May 18, 2023; Nicole Symon; 9 pages.
What is Venmo?—NerdWallet Jun. 24, 2024; Chanelle Bessette; 7 pages.
U.S. Appl. No. 61/899,734, filed Nov. 4, 2013; Inventor Ahmer A. Khan; 40 pages.
U.S. Appl. No. 61/905,035; Inventor George R. Dicker; et al.; Nov. 15, 2013; 58 pages.
U.S. Appl. No. 61/921,688, filed Dec. 30, 2013; Inventor Ahmer A. Khan; 54 pages.
"A Primer to the Implementation of Smrt Card Management and Related Systems," Version 1.0 Aug. 2000 GlobalPlatform; 47 pages.
"An Introduction to Java Card Technology—Part 1" 29-May 03 C. Enrique Ortiz Sun Developer Network; 16 pages.
"An Introduction to Java Card Technology—Part 2, The Java Card Applet" Sep. 2003 C. Enrique Ortiz Sun Developer Network; 13 pages.
"An Introduction to Java Card Technology—Part 3, The Smart Card Host Application" Sep. 2003 C. Enrique Ortiz Sun Developer Network; 11 pages.
"An Investigation into Electronic Commerce Frauds and their Security Implications" Nov. 7, 2004 Kevin Boardman; 67 pages.
"Contactless Payment Security Questions & Answers" 2016 Smart Card Alliance, Inc.; 4 pages.
"EMV Card Personalization Specification," Version 1.0 Jun. 03 EMVCo, LLC; 81 pages.
"EMV Integrated Circuit Card Specifications for Payment Systems," Book 1, Application Independent ICC to Terminal Interface Requirements, Version 4.Nov. 3, 2011 EMVCo, LLC; 189 pages.
"EMV Integrated Circuit Card Specifications for Payment Systems," Book 2, Security and Key Management, Version 4.May 1, 04 EMVCo, LLC; 187 pages.
"EMV Integrated Circuit Card Specifications for Payment Systems," Book 2, Security and Key Management, Version 4.Nov. 3, 11 EMVCo, LLC; 174 pages.
"EMV Integrated Circuit Card Specifications for Payment Systems," Book 3, Application Specification, Version 4.May 1, 04 EMVCo, LLC; 237 pages.
"EMV Integrated Circuit Card Specifications for Payment Systems," Book 3, Application Specification, Version 4.Nov. 3, 2011 EMVCo, LLC; 230 pages.
"EMV Integrated Circuit Card Specifications for Payment Systems," Book 4, Cardholder, Attendant, and Acquirer Interface Requirements, Version 4.Nov. 3, 2011 EMVCo, LLC; 154 pages.
"Interoperability in Electronic Payments: Lessons and Opportunities" 2012 Carol Coye Benson CGAP; 46 pages.
"Investigating Mobile Payment: Supporting Technologies, Methods, and Use" 2005 Valcourt, et al.; IEEE; 8 pages.
"Java Card Technology Overview," Chapter 3; 20 pages.
"Java Card™ 2.2 Off-Card Verifier" White Paper Jun. 02 Sun Microsystems; 24 pages.
"Java Card™ Platform Security" Technical White Paper 2001 Sun Microsystems; 26 pages.
"Radio-Frequency Identification (Rfid): A Focus on Information Security and Privacy," OECD Digital Economy Papers, No. 138 Jan. 14, 2008 OECD Publishing; 71 pages.
"SE vs. HCE: What is More Secure for NFC Mobile Payments?" Oct. 17, 2014 Finextra; 6 pages.
About US | Venmo 2012 Venmo.com.
Apple Press Release: "Apple Announces Apple Pay" Sept. 9, 2014 Apple; 4 pages.
GlobalPlatform Technical Overview Jan. 22, 2003 Marc Kekiheff GlobalPlatform; 9 pages.
E-ink on Credit Cards will do Away with PINs (video) Sept. 2, 2011 The Digital Reader; 6 pages.
Emue - a Revolution in Authentication May 13, 2009 EMUE; 1 page.
For Businesses: Payment Technologies—Products & Platforms 2004 Visa; 3 pages.
For Businesses: Payment Technologies—Visa Cash 2004 Visa; 1 page.
For Businesses: Payment Technologies—Visa Smart debit and Visa Smart Credit 2004 Visa; 2 pages.
GlobalPlatform—Implementations—Financial 2006 GlobalPlatform; 7 pages.
GlobalPlatform—Implementations—Mobile Telecom 2006 GlobalPlatform; 3 pages.
GlobalPlatform—Implementations—Retail 2006 GlobalPlatform; 1 page.
GlobalPlatform—Implementations—Transit 2006 GlobalPlatform; 2 pages.
GlobalPlatform—Interoperability and Security with GlobalPlatform Feb. 2, 2004 Marc Kekiheff GlobalPlatform; 70 pages.
GlobalPlatform—Overview Jun. 04 GlobalPlatform; 38 pages.
GlobalPlatform—The Cross-Industry Approach to Smart Card Standards 2000 GlobalPlatform; 3 pages.
GlobalPlatform: a Dynamic and Secure Pre and Post Issuance Solution—Cartes 2002 2002 Marc Kekiheff GlobalPlatform; 28 pages.
GlobalPlatform Card Security Requirements Specification Jan. 22, 2003 Marc Kekiheff GlobalPlatform; 13 pages.
GlobalPlatform Card Specification Tutorial Jan. 22, 2003 Marc Kekiheff GlobalPlatform; 40 pages.
GlobalPlatform Specifications Archive—Technology Document Library 2024 GlobalPlatform; 12 pages.
TPM Mobile with Trusted Execution Environment for Comprehensive Mobile Device Security, Jun. 2012; 6 pages.
Magtek, Magnetic Stripe Card Standards, (MagTek Inc. eds., 2011); 2 pages.
EMVco, LLC, EMV Integrated Circuit Card Specifications for Payment Systems: Book 2—Security and Key Management (EMVCo, LLC eds., Version 4.3 2011); 174 pages.
Klaus Finkenzeller, RFID Handbook (John Wiley & Sons, 3rd ed. 2010); 480 pages.
Smart Card Alliance, EMV and NFC: Complementary Technologies that Deliver Secure Payments and Value-Added Functionality (Smart Card Alliance, Inc. eds., 2012); 15 pages.
Mastercard, MasterCard Approved Mobile Devices, Mastercard (Aug. 3, 2012), http://www.mastercard-mobilepartner.com/docs/MasterCard_Approved_Mobile_Devices.pdf , [ https://web.archive.org/web/20120906234255/http://www.mastercard-mobilepartner.com:80/docs/MasterCard_Approved_Mobile_Devices.pdf; 1 page.
EMVco, LLC, EMV Chip At-a-Glance: Enabling Seamless and Secure Contact and Contactless Payments Around the World, EMVCO (2002), https://www.emvco.com/wp-content/uploads/2022/09/EMV%C2%AE-Chip-At-A-Glance-EMVCo-eBook.pdf: 11 pages.
Scoping SIG & Tokenization Taskforce PCI Security Standards Council, PCI Data Security Standard (PCI DSS)—Information Supplement: PCI DSS Tokenization Guidelines (PCI Security Standards Council eds., Version 2.0 2011).
Alessandro Vizzarri et al., Security in Mobile Payments (2013): 6 pages.
"The Electronic Purse", John Wenninger and David Laster, Federal Reserve Bank of New York, 1995 https://www.newyorkfed.org/medialibrary/media/research/current_issues/ci1-1.pdf [https://web.archive.org/web/20170502002450/https://www.newyorkfed.org/medialibrary/media/research/current_issues/ci1-1.pdf]: 6 pages.
"A Monolithic Three-Axis Silicon Capacitive Accelerometer with Micro-G Resolution," J. Che, et al., Transducers '03. 12th International Conference on Solid-State Sensors, Actuators and Microsystems. Digest of Technical Papers, Boston, MA, USA, 2003, pp. 81-84 vol. 1.

(56) References Cited

OTHER PUBLICATIONS

Apple Presents iPhone 4, available at: https://www.apple.com/newsroom/2010/06/07Apple-Presents-iPhone-4/; 5 pages.
"Motion sensing in the iPhone 4: MEMS accelerometer," MEMS Journal—The Largest MEMS Publication in the World, available at: https://www.memsjournal.com/2010/12/motion-sensing-in-the-iphone-4-mems-accelerometer.html; 5 pages.
Review of the Motorola Droid from Verizon Wireless—Digital Bits Technology Column, available at: https://www.andybrain.com/2009/review-of-the-motorola-droid-from-verizon-wireless/; 7 pages.
Top 10 HTC Smartphones of 2011 IBTimes, available at: https://www.ibtimes.com/top-10-htc-smartphones-2011-388788; 28 pages.
U.S. Appl. No. 61/619,095 to Collinge et al.
U.S. Appl. No. 61/635,248 to Collinge et al.
U.S. Appl. No. 61/735,383 to Collinge et al.
U.S. Appl. No. 61/762,098 to Collinge et al.
Ann Cavoukian, Mobile Near Field Communications (NFC) "Tap 'n Go" Keep it Secure & Private, IPC (2011), https://www.ipc.on.ca/sites/default/files/legacy/Resources/mobile-nfc.pdf; 22 pages.
Annika Paus, Near Field Communication in Cell Phones; Jul. 24, 2007; 26 pages.
Ashis K. Mahapatra, Touch Screen Systems, Orissa Review (2005), https://magazines.odisha.gov.in/orissareview/Jun.2005/engpdf/touch_screen_system.pdf; 5 pages.
Anup K. Ghosh & Tara M. Swaminatha, Software Security and Privacy Risks in Mobile E-Commerce, 44 CACM 51 (2001); 7 pages/.
1747.09 Printing credit or debit card receipts; restrictions, CA Civil, Jan. 2009; 2 pages.
Google Wallet and the New Retail Ecosystem Oct. 3, 2011 David W. Schropfer; 3 pages.
Government Smart Card Handbook Feb. 2004 GSA; 262 pages. (Uploaded as Prt1 and Prt2).
Implementing Electronic Card Payment Systems 2003 Cristian Radu; 49 pages.
Java Card for ePayment Applications 2002 Vesna. Hassler; 40 pages.
Java Card Platform: A Week in the Life of Jack Link 2004 Sun Microsystems; 6 pages.
Java Card Questions and Answers with Zhiqun Chen Oct. 2000 Ed Ort Sun Microsystems; 4 pages.
Java Card Technology Datasheet 2005 Sun Microsystems; 3 pages.
Java Card Technology Examples 2004 Sun Microsystems.
Java Card Technology FAQs 2005 Sun Microsystems; 3 pages.
Venmo; Just say "Venmo Me"; 2021; 24 pages.
Java Card1_Fig-12 2006 Sun.com;1 page.
Java Card1_Fig-3 2005 Sun.com; 1 page.
Java Card1_Fig-4 2005 Sun.com; 1 page.
Java Card1_Fig-5 2006 Sun.com; 1 page.
Java Card1_Fig-7 2004 Sun.com; 1 page.
Java Card1_Fig-9 2004 Sun.com; 1 page.
Java on Smart Cards: Programming and Security: First International Workshop, JavaCard 2000; Isabelle Attali, Jefferson Jensen; 25 pages.
JavaCard—From Hype to Reality 1999 Michael Baentsch; IEEE; 8 pages.
JavaCard—Redistribution and Use in Source and Binary Forms License 2004 Sun Microsystems; 5 pages.
Jcop V2.4.1 Secure Smart Card Controller, Rev. 3.2 Sept. 2, 2009; NXP; 18 pages.
MagTek Introduces Qwick Code Mobile Wallet Jan. 15, 2012; 1 page.
Visa Invests in Authentication Outfit Emue Nov. 18, 2009 Finextra; 2 pages.
Mastercard Virtual Card Tokens; Mar. 7, 2025; Mastercard; 1 page. Year is missing.
Mobile Payment Services in South Africa; Jan. 31, 2013; Matthias Beland; 124 pages.
NXP—News Center—Infocus Archive 2006 NXP; 4 pages.
PCI - Payment Card Industry (PCI) Data Security Standard, Version 2.0 Oct. 2010 PCI; 75 pages.
PCI Data Security Standard (Pci Dss), Version 2.0 Aug. 2011 Scoping SIG, Tokenization Taskforce PCI Security Standards Council; 23 pages.
PHB Development, Kurt Salmon, "Mobile Payments ... a "Southern" Revolution!" 2011 PHB Development; 63 pages.
Visa Best Practices for Tokenization Version 1.0 14-Jul. 10 Visa Best Practices; 4 pages.
Qwick Codes Mobile Wallet for Ios Cnet; 2005; 11 pages.
Visa and Emue Technologies deploy cards with built-in one-time password generator Feb. 9, 2009 Finextra; 1 page.
Techie Visa Card Features Buttons and Screen to Generate CCV Dynamically Nov. 11, 2008 Mark Wilson; 1 page.
Venmo, Just Say "Venmo Me" 2021 Venmo; 24 pages.

* cited by examiner

MULTI-FUNCTION SMART TOKENIZING ELECTRONIC PAYMENT DEVICE

RELATED APPLICATION(S)

This Application is a Continuation Application of co-pending, commonly owned U.S. patent application Ser. No. 17/528,073, filed Nov. 16, 2021, which in turn was a Continuation of U.S. patent application Ser. No. 17/075,637, now U.S. Pat. No. 11,176,538, filed Oct. 20, 2020, which in turn was a Continuation of U.S. patent application Ser. No. 16/459,150, now U.S. Pat. No. 10,810,579, filed Jul. 1, 2019, which in turn was a Continuation of U.S. patent application Ser. No. 15/701,261, now U.S. Pat. No. 10,339,520, filed Sep. 11, 2017, which in turn was a Continuation of U.S. patent application Ser. No. 14/981,757, now U.S. Pat. No. 9,760,884, filed Dec. 28, 2015, which in turn was a Continuation of U.S. patent application Ser. No. 14/680,979, now U.S. Pat. No. 9,224,083, filed Apr. 7, 2015, which in turn was a Division of U.S. patent application Ser. No. 14/217,261, now U.S. Pat. No. 9,022,286, filed Mar. 17, 2014, which in turn Claimed Priority from U.S. Provisional Patent Application Ser. No. 61/794,891, filed Mar. 15, 2013. All such applications are incorporated herein by reference in their entireties.

FIELD OF INVENTION

Embodiments according to the present disclosure generally relate to electronic or smart payment devices and, more specifically, to more secure, smart multi-function smart tokenizing electronic payment devices and transaction processing thereof.

BACKGROUND

There are several different types of credit cards available in the marketplace at present. A first type of credit card is a conventional, standard piece of plastic with a magnetic strip, which is readily available and in wide commercial use. The advantage of this first type of credit card is that a large portion of the infrastructure for credit card transactions is built around this type of card, and consequently such a card works in a wide array of vendors' credit card machines, automated teller machines (ATMs), and other devices that support the present credit card and banking infrastructure.

Another type of credit, card device employs the use of a smart integrated circuit chip. These types of credit cards have a built-in microprocessor with cryptographic capabilities. These microprocessors operate in a similar manner to a cell phone having a chip comprising a cryptographic processor. Such a smart card device requires contact with a reader in order to be read and to perform a transaction. The reader provides the manner in which a facility interacts with the built-in processor on the card, e.g., for purposes of performing verification on the authenticity of the card or for making a direct deposit on the card. These credit card devices also comprise a magnetic strip such that they are compatible with standard plastic credit card readers in wide use.

A different, type of credit card device in circulation employs radio frequency identification ("RFID") These cards essentially have a low-power RF antenna built into the card, and when the cardholder passes the antenna in front of a reader comprising an RF field, enough power is generated to enable the processor to interact wirelessly with the receiving device.

A concern with each of these types of credit cards presently available in the marketplace is that they can all be, in various ways, susceptible to theft and/or compromise. Therefore, these types of credit cards have security limitations. Further, cards employing smart integrated circuit chips and RF technology are not in wide use at present because they are incompatible with existing credit card infrastructure, which still predominantly supports conventional plastic credit cards.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An embodiment includes a multi-function electronic device capable of generating a programmed magnetic field of alternating polarity based on a speed of a card swipe, and methods for constructing the device for the purpose of emulating a standard credit card. An apparatus is described to allow said device to emulate behavior of a credit card when used in electronic credit card readers. Additionally, methods are described to allow user control of said device for the purpose of authorizing or controlling use of said device in the application of credit, debit and cash transactions, including cryptocurrency and device-to-device transactions. Methods are also described for generating a limited-duration payment number when performing a transaction for the purpose of creating a limited-use payment number, which is limited in scope of use to a predetermined number of authorized transactions. Furthermore, said device may interact with other similar devices in proximity for the purpose of funds or credit/debit transfers.

More specifically, an aspect of the present disclosure provides an apparatus comprising: a thin card shaped sized body; a memory operative to store a plurality of identification data; a processor coupled to the memory; a user interface for selecting a select identification data of said plurality of identification data; a magnetic card reader detection unit for determining if the body is adjacent to a standard magnetic card reader; and an inductor assembly coupled to the processor and integrated into the body, the inductor assembly under processor control for generating a magnetic field of alternating polarity responsive to the body being detected as adjacent to a standard magnetic card reader, the magnetic field generated in a region substantially encompassing the standard magnetic card reader, wherein the magnetic field encodes said select identification data, and wherein the magnetic field is operable to be read by a magnetic read head of the standard magnetic card reader.

According to another aspect of the present disclosure, a multi-function electronic device comprises: a near-field communication (NFC) unit; a touch sensor array; a display; a motion rate detection array; a memory, storing a user data and a currency amount; and a processor operatively coupled to the NFC unit, the touch sensor array, the display, the motion rate detection array, and the memory; and wherein the processor initiates a device-to-device transaction between two devices by a detected proximity of a first device and a second device and an input of information by a first user via said touch sensor array, and wherein the device-to-device transaction comprises an exchange of stored currency and said user data between the first device and the second device via the NFC unit.

According to yet another aspect of the present disclosure, a method of performing a transaction comprises: receiving an input signal at a multi-function electronic device from a user enabling operation of a near-field communication (NFC) unit of the device; receiving an indication of an amount of currency for a transaction; generating at said device a limited-duration payment number; and transmitting said limited-duration payment number from said device to a recipient of the transaction.

BRIEF DESCRIPTION OF THE DRAWINGS

Embodiments of the present disclosure are illustrated by way of example, and not by way of limitation, in the figures of the accompanying drawings and in which like reference numerals refer to similar elements.

DETAILED DESCRIPTION

Figure 1:
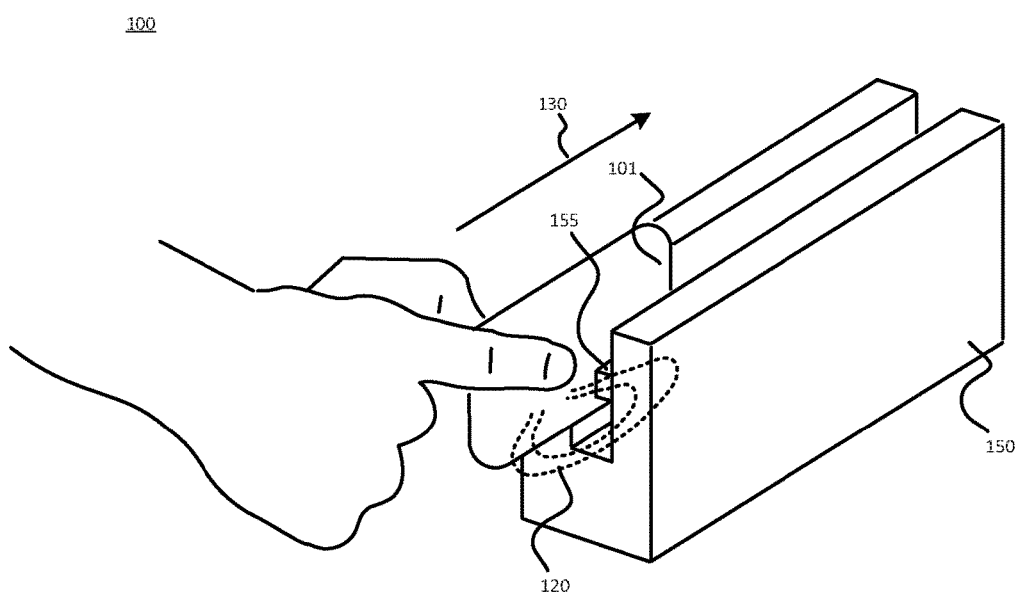
FIG. 1 is an illustration depicting an exemplary interaction between a device and a standard magnetic card reader, according to an embodiment of the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "storing," "creating," "protecting," "receiving," "encrypting," "decrypting," "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

In one embodiment of the present disclosure, a smart multi-function electronic device comprises a dynamic magnetic region (strip) incorporating a main inductor assembly from which programmed magnetic field data symbols are dynamically generated. In one embodiment the inductor assembly may be a planar coil formed within the material that embodies the multi-function electronic device. An advantage of using a planar coil is that it can dynamically produce a magnetic field in such a manner as to emulate the interaction between a traditional magnetic strip and a conventional card reader. As the magnetic strip of a conventional card is passed through a magnetic reader head, stripes of alternating magnetic polarity embedded in the strip induce a magnetic field of alternating polarity at the reader head. The pattern formed by the alternating polarity of the magnetic field encodes information, which when transformed by a transducer to a current signal in the magnetic reader head, provides user information for a transaction.

Embodiments of the present disclosure provide a multi-function electronic device able to generate a programmed magnetic field, wherein data is encoded and represented by an alternating polarity of the generated magnetic field. In a similar manner to a conventional plastic card, the magnetic field produced by the planar coil is able to be read by a pickup (or "transducer") and to thereby transmit information to the magnetic card reader. FIG. 1 illustrates a payment transaction 100 performed between a multi-function electronic device 101 and a conventional magnetic reader 150. The multi-function electronic device 101 generates a magnetic field of alternating polarity 120 to be read by the conventional magnetic card reader 150, according to an embodiment of the present disclosure. The multi-function electronic device 101 is moved at a rate 130 relative to a magnetic reader head 155 of conventional magnetic card reader 150. The magnetic field 120 extends with sufficient distance and intensity from 101 so as to be read by magnetic head reader 155. The magnetic head reader 155 responds to the magnetic field 120 by producing a current in the conventional fashion, which is then interpreted as encoded information by the magnetic reader 150. Therefore the magnetic field of alternating polarity 120 produced by the multi-function electronic device 101 has a substantially identical encoding effect as a traditional magnetic strip.

A characteristic of encoding information in a conventional magnetic card strip is that binary information is encoded by the pattern of alternating magnetic polarity formed by ferromagnetic stripes embedded on the magnetic strip. As the conventional magnetic card strip has a standardized format, the encoding of information is provided at a specified data density (bits per inch), according to which conventional magnetic readers are designed for interpretation of encoded data. In order to most ably emulate a conventional card interaction with a conventional magnetic reader the multi-function electronic device 101 of the present disclosure is provided with a means of determining a substantially optimal rate for alternating the polarity of the generated magnetic field 120 in order to produce data at a rate which is able to be readily received and correctly interpreted by the conventional magnetic reader 150. Embodiments of the present disclosure provide several means of determining the relative movement rate 130 between the multi-function electronic device 101 and the magnetic reader head 155. These features, as well as other characteristics of the multi-function electronic device of the present disclosure, can be better appreciated by a description of the internal components and functions of multi-function electronic device 101.

Figure 2A:
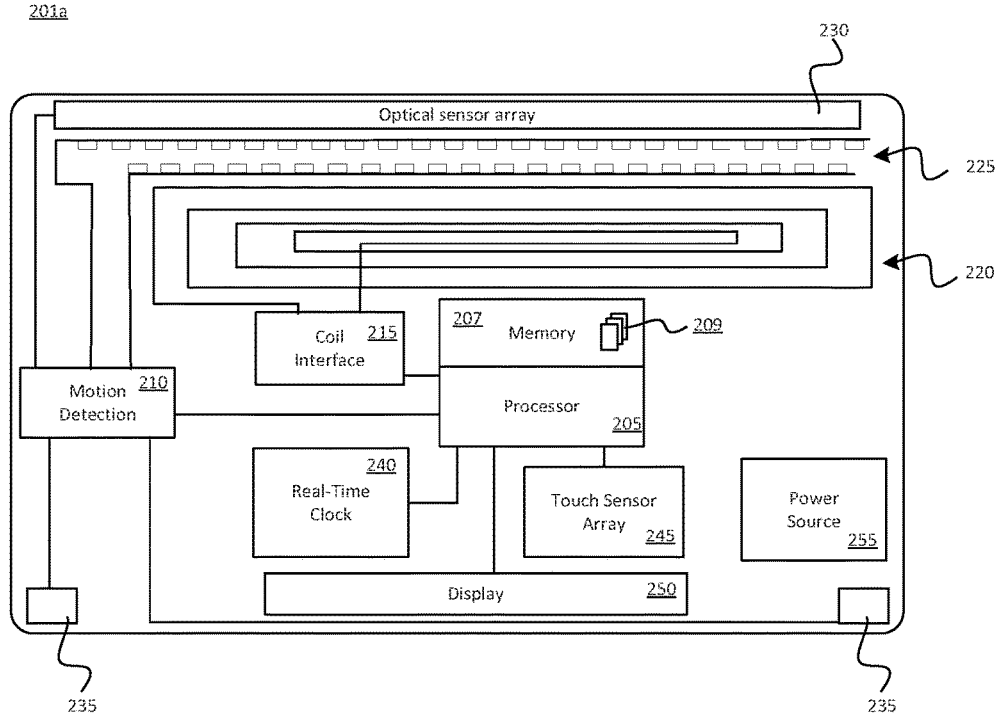
FIGS. 2A-2B are block diagrams illustrating data flow between the magnetic coils on the device and the microprocessor on the device according to an embodiment of the present disclosure.
Figure 2B:
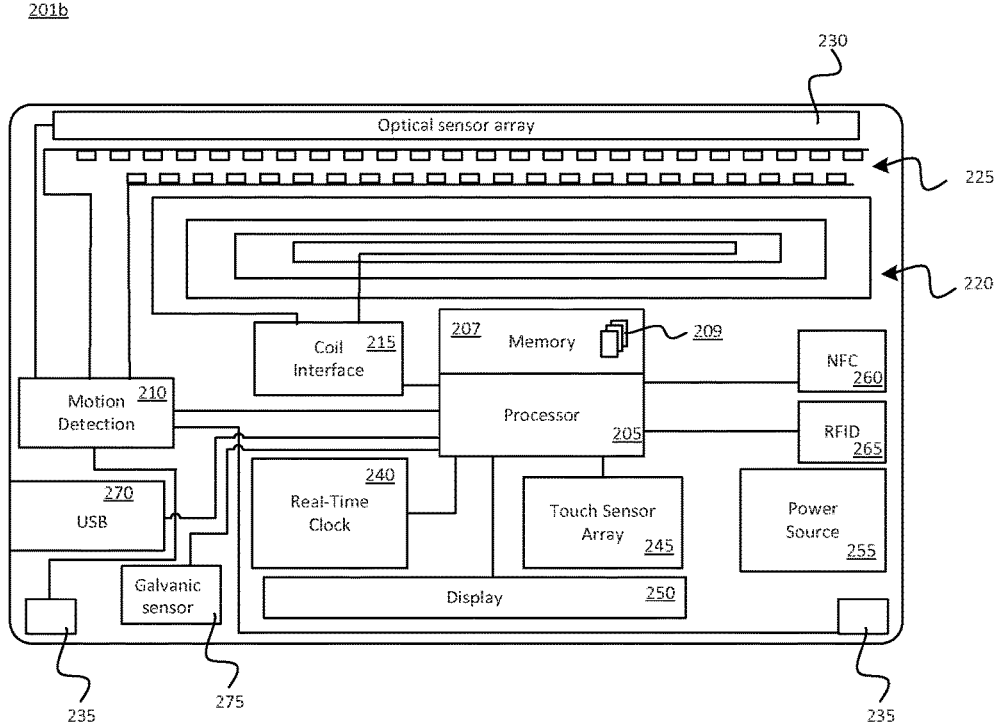

FIGS. 2A and 2B depict exemplary embodiments of a smart multi-function electronic device, in a block diagram view. The components of the block diagram are illustrated according to functional connections, and their locations should not be construed as being limited to the respective locations as depicted in FIGS. 2A-2B. In FIG. 2A, multi-function electronic device 201 *a* is shown in a block diagram view. Multi-function electronic device 201 *a* comprises a processor 205 and a memory unit 207, the processor 205 operatively coupled to the components of multi-function electronic device 201 *a*. The memory 207 comprises a plurality of accounts 209, which may be credit card accounts, banking accounts, merchant accounts, online accounts, cryptocurrency accounts, and combinations thereof. A motion detection module 210 is coupled to the processor unit 205 and to a set of motion detection units, which comprise a rate detection assembly 225, an optical sensor array 230, and a set of accelerometers 235. The magnetic field is generated via a planar coil 220, which is controlled by the processor unit 205 via a coil interface 215. The rate at which the magnetic field changes polarity to encode the user data depends on the rate of relative movement detected by the rate detector. The multi-function electronic device 201 *a* further comprises a real-time clock 240, a touch-sensor array 245, and a display 250, each operatively coupled to the processor unit 205. A user input may be made via the touch sensor array 245, which may comprise a touch screen panel, a keypad, or a combination thereof. The display 250 is able to display an alphanumeric sequence, as well as graphical icons (such as a logo for a bank, or other images). Further, an optional backup power source 255 is depicted.

In one embodiment, the processor unit 205 is connected to the planar coil 220 and the motion detection units, via the motion detection module 210. The processor unit 205 is responsible for determining the appropriate rate with which to output data from the planar coil 220, wherein output data is encoded using alternating polarity of a generated magnetic field. The rate of the alternating polarity of the magnetic field is generated in accordance with the detected movement speed with which the card is swiped through the reader, in order for the reader to receive the encoded data at the appropriate rate. Magnetic card readers, which are designed to read conventional cards, are constructed to read data at specified input rates that correspond with the data density present in conventional magnetic card strips. The magnetic data symbols generated by the planar coil 220 are produced to align with the rate at which data is being read by the magnetic card reader. Accordingly, it is irrelevant if the multi-function electronic device 201 *a* of the present disclosure is being swiped quickly or slowly, the planar coil 220 is controlled by the processor unit 205 to produce data at a substantially optimized rate, where the rate of data production is dependent on the rate at which the multi-function electronic device 201 *a* is detected to be passing across the magnetic reader head.

FIG. 2B depicts a multi-function electronic device 201 *b* according to an embodiment of the present disclosure. Device 201 *b* comprises a processor 205 and a memory unit 207, the processor 205 operatively coupled to the components of multi-function electronic device 201 *b*. The memory 207 comprises a plurality of accounts 209, which may be credit card accounts, banking accounts, merchant accounts, online accounts, cryptocurrency accounts, and combinations thereof. A motion detection module 210 is coupled to the processor unit 205 and to a set of motion detection units, which comprise a rate detection assembly 225, an optical sensor array 230, and a set of accelerometers 235. Additionally, a galvanic sensor 275 is coupled to processor unit 205. The magnetic field is generated via a planar coil 220, which is controlled by the processor unit 205 via a coil interface 215. The rate at which the magnetic field changes polarity to encode the user data depends on the rate of relative movement detected by the rate detector. The multi-function electronic device 201 *b* further comprises a real-time clock 240, a touch-sensor array 245, and a display 250, each operatively coupled to the processor unit 205. A user input may be made via the touch sensor array 245, which may comprise a touch screen panel, a keypad, or a combination thereof. The display 250 is able to display an alphanumeric sequence, as well as graphical icons (such as a logo for a bank, or other images). Further, an optional backup power source 255 is depicted. Multi-function electronic device 201 *b* further comprises a near-field communication (NFC) unit 260, as well as a radio frequency identification (RFID) unit 265, both of which are operatively coupled to the processor unit 205. In one embodiment the NFC and RFID may share the planar coil for use as a radio frequency antenna, through the coil interface 215. In one embodiment one or both the NFC and the RFID may have antennae dedicated to that individual sub-system. A universal serial bus (USB) connector 270 is coupled to the processor unit 205. The functionality of the components with regard to exemplary uses of multi-function electronic devices 201 *a* and 201 *b* is described in greater detail in the following description.

A further aspect of the present disclosure provides a single multi-function electronic device that can be used for multiple banks or financial institutions. For example, instead of carrying a separate payment card for each account of a variety of payment card companies, a customer need only to carry a single device according to embodiments of the present disclosure. The capability of the multi-function electronic device to generate a multitude of payment numbers provides the ability of the multi-function electronic device to be associated with multiple accounts. Furthermore, inputs at the touch sensor array on the multi-function electronic device can be used to select the appropriate bank or credit provider account stored in the memory unit of the multi-function electronic device.

Figure 2C:
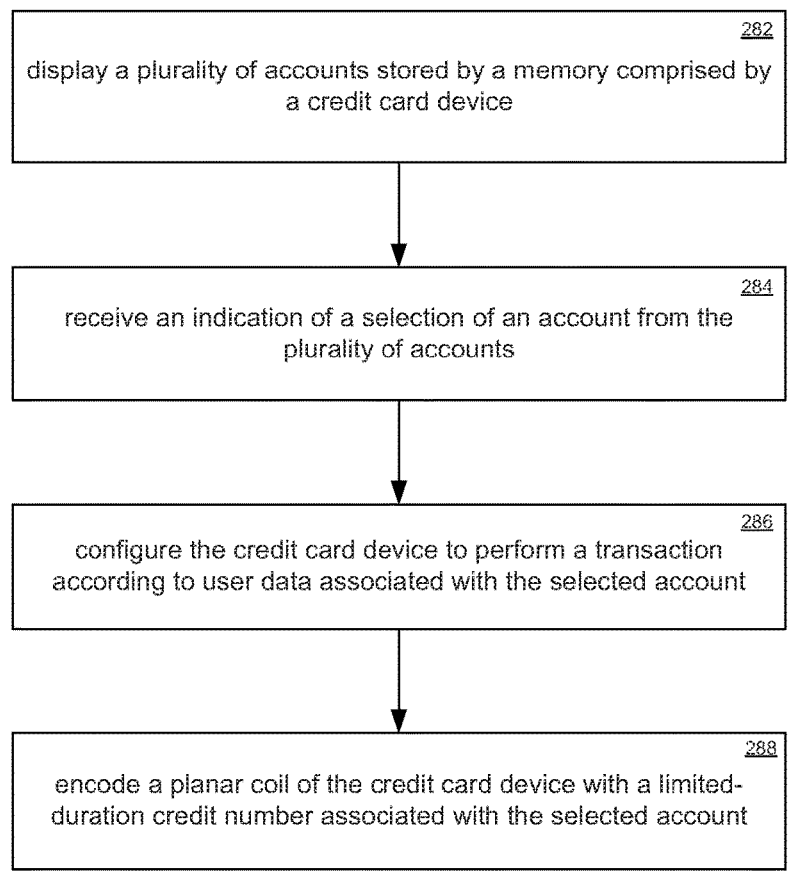
FIG. 2C depicts an exemplary process of selecting an account from a plurality of stored accounts according to an embodiment of the present disclosure.

FIG. 2C depicts a process of selecting an account from a plurality of stored accounts in order to perform a transaction with the selected account, according to an embodiment of the present disclosure. The process 280 begins at step 282, where a plurality of accounts stored by the multi-function electronic device memory is displayed. The plurality of accounts 209 are stored by memory 207, and are displayed using display 250. A user indicates an account selected from the plurality of accounts at step 284. The selection is able to be made by keypad or touch sensor array 245, and an indication of the selected account can be displayed via display 250. At step 286 the multi-function electronic device is configured according to account information associated with the selected account, which may include an account number, an expiration date, and other user information associated with the account (e.g. a username, PIN, password, email address, etc.). At step 288 the planar coil of the multi-function electronic device is encoded with a limited-duration payment number that is associated with the selected account. The limited-duration payment number is able to be generated according to the selected account, a timestamp, a transaction amount, an indicated merchant, user key or secrets, on-card unique hardware secrets, payment authority key or secrets, user input from the card interface, and other information associated with the transaction.

Movement Rate Feedback

The relative movement rate of multi-function electronic device 201 *a* is detected by one or more of the set of motion detection units, comprising the rate detection assembly 225, the optical sensor array 230, and the set of accelerometers 235. Each of the motion detection units detects the motion of the device 201 *a* in a distinct manner. The rate detection assembly 225, which is positioned alongside (but independent of) the planar coil 220, is able to detect the location of a magnetic head reader as the rate detection assembly 220 is being passed through the card reader. The reader module of a conventional card reader comprises a metal head having a small gap at the tip of the head. A pickup armature resides in this gap, such that as the metal head passes over a card strip, an electric field is induced in the head reader pickup circuit. In one embodiment the rate detection assembly 225 is constructed of an array of auxiliary inductor coils and magnetic pickup coils. As the metal head of the card reader assembly passes over the arrangement of auxiliary inductor coils and magnetic pickup coils of the rate detection assembly 225, a disturbance in the magnetic field flowing between the two is induced, generating a change in current and producing a detected movement signal. The change in current is detected by the motion detection module 210, and is used to determine the rate of motion of the card reader head passing across the surface of the multi-function electronic device 201 *a* (and therefore along the planar coil 220).

The optical sensor array 230 is also operable to detect a movement rate of the multi-function electronic device 201 *a* with respect to a conventional magnetic card reader. The optical sensor array 230 is disposed nearby the planar coil 220, in order to accurately detect a movement rate in the region of the planar coil 220. In an embodiment, the optical sensor array 230 is a thin strip parallel to, and extending along, the length of the planar coil 220. The optical sensor array 230 determines a location of a minimum of received light, which corresponds to the region of a surface in nearest proximity to the optical sensor array 230. The magnetic reader head of a conventional magnetic card reader extends furthest from the surface of the card reader, and therefore the detected minimum in received light at the optical sensor array 230 corresponds with the location of the reader head. By tracking over time the position of this minimum received light along the optical sensor array, a detected movement rate may be found.

The set of accelerometers 235 are also operable to detect a movement rate of the multi-function electronic device 201 *a*. The set of accelerometers 235 are positioned in the multi-function electronic device 201 *a* in order to effectively measure the position and acceleration of the multi-function electronic device 201 *a*. In an embodiment, the set of accelerometers comprises groups of accelerometers, each group having one or more accelerometers disposed at orthogonal planes to each other, and each group capable of generating signals that allow for determination of the orientation, motion and acceleration of the multi-function electronic device 201 *a*.

The detected movement signal is received by the motion detection module 210. The detected movement signal is generated by any one of the set of motion detection units, or any combination of motion detection units of the set. For example, the movement detection signal is able to be generated by the combination of the rate detection assembly 225 and the optical sensor array 230. In an embodiment, the movement detection module 210 is able to determine the movement rate of the multi-function electronic device 201 *a* from the detected movement signals, and transmits the determined movement rate, and orientation to the processor unit 205. In an embodiment, the motion detection module 210 sends the detected movement signal to the processor unit 205, and the processor unit 205 determines the relative movement rate.

In one embodiment, the generation of the magnetic field by the planar coil 220 at a specified rate of alternating polarity is accomplished according to the following description. One or more of the motion detection units in the set of motion detection units (rate detection assembly 225, optical sensor array 230, and set of accelerometers 235) detect a movement rate of the multi-function electronic device 201 *a* with respect to a magnetic card reader, and signal the motion detection module 210. The movement rate is provided to the processor unit 205, which determines the appropriate rate for alternating the polarity of the magnetic field generated by the planar coil 220. The processor unit 205 outputs instructions or data to the coil interface 215 at the determined rate, which in an embodiment is a digital-to-analog converter (a DAC) and acts to translate the signal from digital to analog in order to drive the planar coil 220 and produce the magnetic field. The instructions from the processor unit 205 are comprise binary code, which are output through a shift register to the coil interface 215. The shift register outputs data at a rate proportional to the determined movement rate of the multi-function electronic device 201 *a*—thus, a higher determined multi-function electronic device 201 *a* movement rate has a corresponding higher output rate at the shift register, leading to a higher rate of alternating polarity at the generated magnetic field (i.e., encoded data symbols output more quickly). Conversely, a lower movement rate of multi-function electronic device 201 *a* leads the processor unit 205 to control the shift register to output data at a lower rate, and consequently the rate of alternating polarity in the generated magnetic field is lower.

Figure 3:
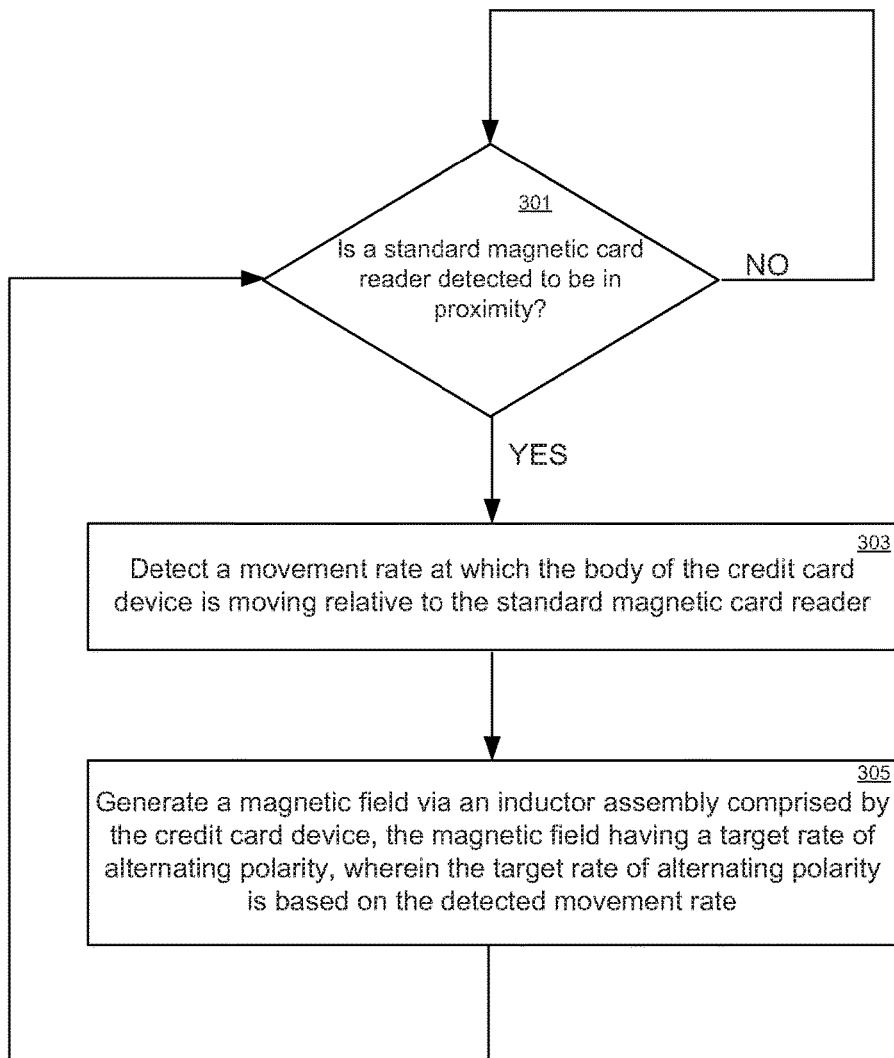
FIG. 3 is a flowchart illustrating an exemplary process of generating a magnetic field with an alternating polarity according to an embodiment of the present disclosure.

FIG. 3 illustrates an exemplary process 300 for determining the rate to alternate the polarity of the generated magnetic field of the multi-function electronic device, according to an embodiment of the present disclosure. At step 301 the process determines if a standard magnetic card reader is detected to be in proximity with the multi-function electronic device. If NO, the step repeats. If YES, the process moves to step 303. At step 303 a detection of a movement rate at which the body of the multi-function electronic device is moving relative to the standard magnetic card reader is made. The process continues at step 305, wherein a magnetic field is generated by an inductor assembly comprised by the multi-function electronic device, the magnetic field having a target rate of alternating polarity that is based on the detected movement rate from step 303. The process then repeats at step 301, determining if a standard magnetic card reader is (or remains) in proximity to the multi-function electronic device. In this manner, while a standard magnetic card reader is detected to be in proximity to the multi-function electronic device, the movement rate of the multi-function electronic device is determined and the polarity and orientation of the generated magnetic field is alternated at the appropriate rate, to recreate the data as described above, at the correct rate, in order to clock out the data to be conveyed to the magnetic strip reader, at a rate matching the action of an ordinary magnetic strip card through same the magnetic card reader.

Security

Security is an area of concern for payment card holders, as the small form factor makes theft quite easy, and additionally there are many ways for a malicious third-party to record the account number of a payment card in order to later make fraudulent transactions on the account. Embodiments of the present disclosure address security concerns of a payment card owner on several fronts.

Figure 4A:
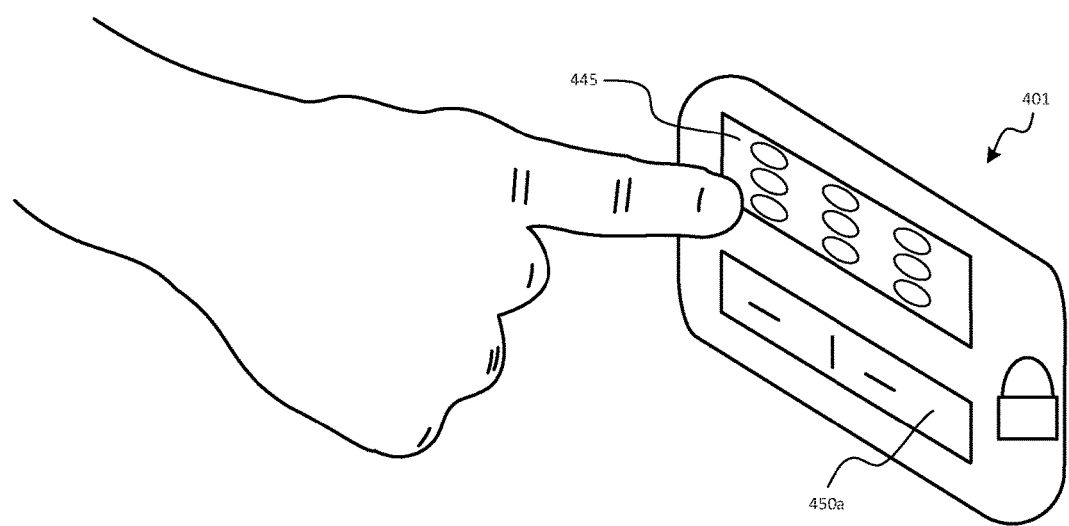
FIGS. 4A-4B illustrate a user interacting with a touch sensor of a device, according to an embodiment of the present disclosure.
Figure 4B:
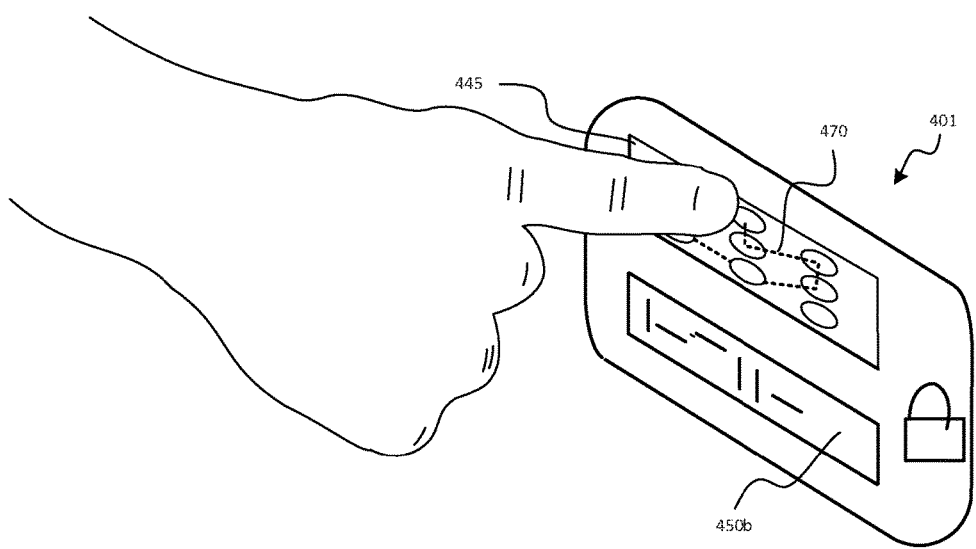

In one aspect, security of the multi-function electronic device is enhanced by providing a means of locking the multi-function electronic device in order to prevent use, until such time that a valid user input is entered. Embodiments of the present disclosure provide a multi-function electronic device having a region for receiving human input, e.g., touch sensors which are able to be formed by contacts that a user can press (e.g., the touch sensor array 245 of FIGS. 2A-2B). FIGS. 4A-4B illustrate a user interacting with a multi-function electronic device 401 via a keypad or touch sensor array 445. In FIG. 4A, the multi-function electronic device 401 is in a locked state. A display 450 is able to display a message to the user, for instance, the message "device locked" or "enter password," or question prompts which guide the user to respond with answers through the key-pad or the touch sensor, to certain preset questions, that confirm personal knowledge known only to the associated user. The touch sensor array 445 enables user interaction with the multi-function electronic device 401. An exemplary use of the touch sensor array 445 is an input of a currency amount to be used in a transaction. The touch sensor array 445 is able to include buttons, or a touch-sensitive pad, or a combination of the two. Other embodiments of the touch sensor array 445 allowing a user to input data to the multi-function electronic device 401 are consistent with the spirit and scope of the present disclosure.

In order to unlock the multi-function electronic device 401 and enable a transaction or other usage, the user inputs data via the touch sensor array 445. FIG. 4B illustrates the user inputting a password via a gesture 470, which operates to unlock the multi-function electronic device 401. The display 450b is able to display a message indicating the multi-function electronic device 401 is unlocked and ready for use, for instance, display 450b may display the message "unlocked," or it may display an account number associated with the multi-function electronic device 401.

Embodiments of the present disclosure provide additional functionality for the touch sensor array 445. For example, there may be touch contact terminals that a user can press to wake up the multi-function electronic device 401, to cause the battery to supply power, or to place the multi-function electronic device 401 in a power reduction mode when it is not being used. In an embodiment, if any number other than the correct password is entered multiple times, or if there is an attempted usage of the multi-function electronic device 401 without entering in a password, an automatic phone call may be triggered to the appropriate fraud protection authorities.

In one embodiment of the present disclosure, the display 450 is a thin-film liquid crystal display ("LCD"). The display 450 is able to have multiple uses. In one embodiment, the display 450 can be used to cue the user for a security question upon input of an improper password. Or if fraud protection services need to contact a customer, they can verify the customer's identity by transmitting a security question to the display 450 of user's multi-function electronic device 401, to which the user would need to respond correctly using the input buttons of touch sensor 445 on the card.

Limited-Duration Payment Number

A further security feature of the multi-function electronic device provided in the present disclosure is the capability of producing a limited-duration payment number for performing transactions using accounts of the card. The multi-function electronic device comprises a real-time clock that is able to produce a cryptographically protected timestamp for each interaction. The power source is able to activate the processor unit such that a unique number may be generated by the multi-function electronic device and verified by the payment authority according to the timestamp and the transmitted user information. The limited-duration payment number is able to be produced at the time the multi-function electronic device is performing a transaction, and is able to be generated according to the user's private information, a bank information, information regarding the facility performing the transaction, and the time of day. The limited-duration payment number is able to be limited to only one transaction, a finite number of transactions, or may be limited to a specified period of time—e.g., 2 minutes, 10 minutes, 3 hours—after which time that particular limited-duration payment number would become invalid. As detailed above, if an expired limited-duration payment number is attempted to be used for a transaction, the transaction is denied and an automatic notification is able to be made to a payment authority in order to notify the user and to prevent transactions on the account. The transaction count is able to be determined through the action of passing the card through magnetic reader, and the process of transmitting the payment number to the card reader.

In one embodiment, the number on the front of the card is able to be a full or partial number. In an embodiment, the number displayed on the multi-function electronic device is a static number, but the number transmitted during a transaction is a limited-duration payment number as described above. The number displayed on the multi-function electronic device may not necessarily be a static number. For example, the first four and last four digits of the payment number are able to be fixed, while the remaining eight digits can be dynamically generated. As the device is read by the machine, part or all of the number may be dynamically produced at the time the device is read. As described above, the dynamic part of the limited-duration payment number generated may be based on the user's private information, the user's bank information, the time of day or the facility that is reading the card. Further, the expiration date of the multi-function electronic device can also be dynamically generated.

Effectively, embodiments of the present disclosure provide a multi-function electronic device that has no fixed number, as illustrated in FIG. 11, and therefore the account cannot be compromised. Only the number generated at the instant of the multi-function electronic device transaction matters. Accordingly, unauthorized use of the multi-function electronic device is highly unlikely, because a transaction cannot be conducted with an expired limited-duration payment number, or only the static portion of the payment number. In one embodiment of the present disclosure, sufficient dynamically generated numbers are provided for on the multi-function electronic device such that a unique payment number can be generated for each transaction. In this embodiment, the multi-function electronic device of the present disclosure effectively acts as a unique per-transaction payment device.

With reference to FIG. 2A, 2B, in one embodiment, the process steps enabling a card transaction are as follows. A multi-function electronic device (e.g., multi-function electronic device 201 b) is connected to a computer system (e.g. computer system 590, FIG. 5), via any of the connection means available to the multi-function electronic device (USB 270, NFC 260, and RFID 265). User data and other essential information, such as account information, are downloaded to the multi-function electronic device. For example, for an account designed for online transactions, user account information will likely include an account email and an account password. The account may be for example a bank account, a credit account, a merchant account, an online transaction account, or a cryptocurrency. In one embodiment a currency amount is also downloaded, which is made accessible to the multi-function electronic device 201 b for transactions. In an alternative embodiment, rather than a currency amount being downloaded to the multi-function electronic device 201 b, the user account information (e.g., username and password) is stored such that a subsequent authorized multi-function electronic device 201 b transaction is automatically pre-authorized to deduct (or credit) the entered transaction amount at a stored account. In an embodiment, a user uses the touch sensor array 245 of the multi-function electronic device 201 b in order to input the user information, including the amount of currency to be stored. The information entered by the user is able to include an account source of a transaction (e.g., bank account, credit account, merchant account, ATM, online payment service, or a cryptocurrency), as well as a type of transaction to be made (e.g., as a debit card, as a credit card, or as a user account). In another embodiment, the information is entered using the computing system to which the multi-function electronic device 201 b is connected.

Transactions may be authenticated on the specified account by entry of the username and password for the account during the transaction, using the touch sensor array 245. In an embodiment, a password for an account is represented by a user input (such as a gesture, a swipe, and/or an unlock keycode) which is entered on multi-function electronic device 201 b during a transaction for account authentication. According to an embodiment of the present disclosure, a user that has "primed" the multi-function electronic device 201 b for a transaction has already performed a security authentication on the card, and therefore a subsequent card transaction is able to be pre-authorized to perform the transaction without further user authentication steps. The priming action can be a tap of the multi-function electronic device 201 b detected by accelerometers 235, or a gesture, swipe, or a key input received by touch sensor array 245.

A transaction is able to be communicated using the planar coil 220. In one embodiment, when the transaction is a payment transaction, a limited-duration payment number is generated. A user inputs an amount for the transaction using the touch sensor array 245, and the limited-duration payment number is generated to correspond with the entered amount. The binary data corresponding to this limited-duration payment number is sent from the processor unit 205 to the coil interface 215, where it is converted to an analog signal in order to drive the planar coil 220 to generate a magnetic field having an alternating polarity corresponding to the encoded data of the limited-duration payment number.

Online Transactions

Figure 5:
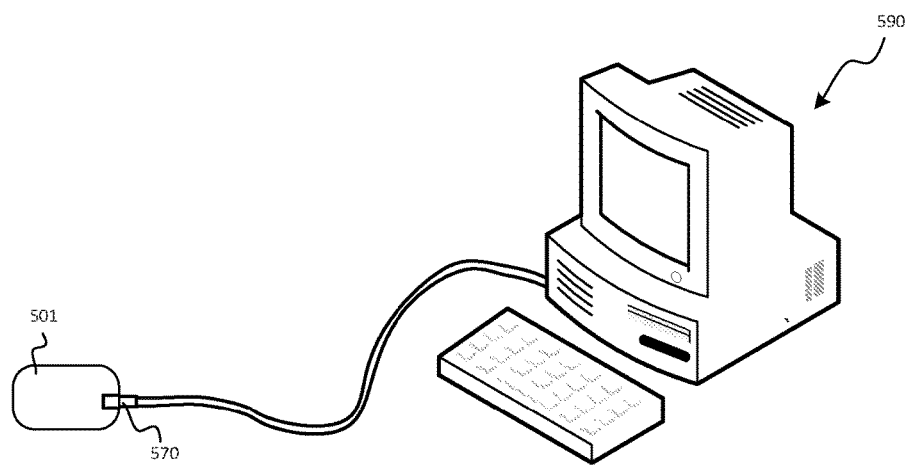
FIG. 5 is an illustration of a device connected with a computing system and operating according to an embodiment of the present disclosure.

FIG. 5 displays the multi-function electronic device 501 in connection with a computing device 590. In one embodiment, the multi-function electronic device 501 is able to be used to make online purchases. In one embodiment, the multi-function electronic device 501 is equipped with a means 570 for communicating with the USB port on a computer or other device in order to make online purchases. In one embodiment the multi-function electronic device 501 may have an area cut out, such that contact terminals corresponding to a USB cable connector are contained within, enabling connection of a USB cable (e.g., a micro-USB connection). When performing online transactions, the multi-function electronic device 501 can uniquely generate a limited-duration payment number (as described above) for online purchases. The multi-function electronic device 501 receives a user input indicating that a transaction is imminent, and an authorization. The user input is able to comprise a gesture, a swipe, a key input sequence, and combinations thereof. The limited-duration payment number is able to be displayed on the front display of the multi-function electronic device 501. In one embodiment, the multi-function electronic device 501 is able to use RFID 265 or near field communication NFC 260 technology in order to connect to a personal computer 590. This enables a per-transaction, limited-use payment number, enhancing the security of the payment account by substantially negating the possibility of a theft of the payment number used to perform the transaction leading to account compromise. See also, for example, FIG. 10.

According to an embodiment, the transaction is able to include information regarding a user account, such as an email address of the user, and upon reconnection of multi-function electronic device 201 b to a computer system (for instance, computer system 590), the transaction information stored on multi-function electronic device 201 b could be "replayed" by the computer system in order to finalize the transaction.

In one embodiment, a means of limiting an available credit amount are provided. According to the download process described above, the multi-function electronic device is able to have a total credit available. The multi-function electronic device is able to reference the total credit available in subsequent transactions, and will provide limited-duration payment numbers corresponding to amounts up to, but not exceeding, the remaining credit available to the multi-function electronic device. An attempt to perform a transaction having an amount exceeding the remaining credit available will not result in a valid limited-duration payment number, and therefore an authenticated transaction cannot proceed. In general, the multi-function electronic device will only successfully generate a limited-duration payment number if the proper conditions for a transaction are determined to be present. The proper conditions for a transaction comprise a correct identification having been made by the user (via a gesture, swipe, and/or key input) and an amount for the transaction indicated to be less than the total credit available to the account indicated for the transaction.

Device-to-Device Transactions

In addition to transactions performed using conventional magnetic card readers (such as at point-of-sale locations, banks, and automated teller machines (ATMs)) and via cable connection with a computing device, transactions performed wirelessly between a device and a device (e.g., card-to-card, card-to-computer device having a reader dongle, card-to-ATM) are provided according to embodiments of the present disclosure. See, for example, FIGS. 8 and 10. For simplicity, the following describes a device-to-device transaction, but it will be understood that card-to-device transactions are similarly provided.

Figure 6:
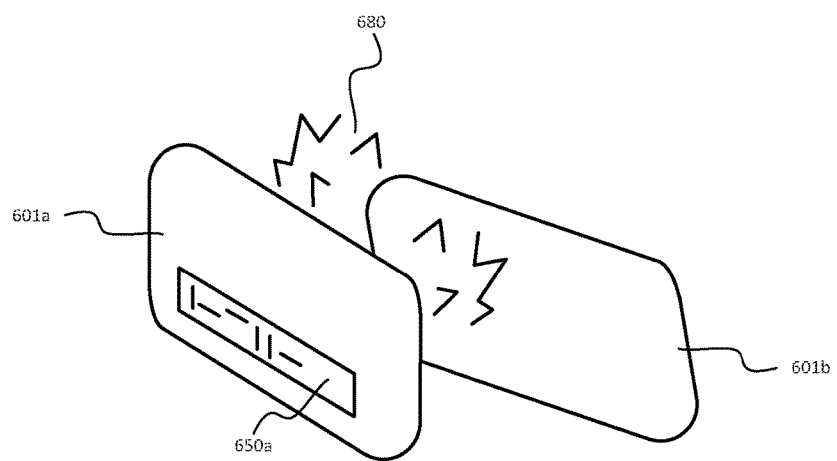
FIG. 6 is an illustration of two devices performing a transaction according to an embodiment of the present disclosure.

FIG. 6 illustrates a device-to-device transaction according to one embodiment. A first multi-function electronic device 601 *a* comprises a display 650*a*, and is in contact with a second multi-function electronic device 601 *b*. A contact interaction between the devices is indicated by interaction 680. In one embodiment, the contact interaction is a tapping of a device 601 *a* against another device 601 *b*. In another embodiment, an optical sensor array at one or both of the devices detects interaction 680. In another embodiment, interaction 680 indicates a swipe of a device 601 *a* across another device 601*b*. In one embodiment a user input through the key-pad initiates and enables a transaction from first device to second device. In one embodiment the presence of second device in preparation for device-to-device transaction is confirmed through "polling", the process of which involves transmission of data between devices, and confirmed receipt of transmitted data by response received from second device received at first device, including information confirming receipt of the information, by second device.

The planar coil comprised by each of multi-function electronic device 601 *a* and multi-function electronic device 601 *b* is able to be a means of transferring information for a transaction, e.g., such as an antenna. Once either, or both, of multi-function electronic device 601 *a* and multi-function electronic device 601 *b* detect interaction 680, a transaction is able to be completed via generation of a magnetic field at one card and reception of the magnetic field (i.e., reading) at the other card. In this manner, the device (e.g., multi-function electronic device 601 *a*) receiving the transaction information operates its planar coil in an antenna mode. This enables multi-function electronic device 601 *a* and multi-function electronic device 601 *b* to authentically perform a transaction, and to transfer a currency between multi-function electronic device 601 *a* and multi-function electronic device 601 *b*. As described above, in an embodiment the transaction is able to use a limited-duration payment number to encode the transaction.

In an embodiment, a set of accelerometers is used to detect the beginning of the transaction, for instance, a transaction performed by a swipe of multi-function electronic device 601 *a* across multi-function electronic device 601 *b*. Further, the set of accelerometers can detect a "priming" action for a multi-function electronic device, i.e., an indication for a multi-function electronic device that a transaction is imminent. The priming action can be a tap of the multi-function electronic device 601 *a*, or tapping the multi-function electronic device 601 *a* against the multi-function electronic device 601 *b*. In one embodiment, a touch sensor array is able to be used for the priming action.

In an embodiment of a device-to-device transaction, one device (e.g. 601 *a*, the device of the user having a currency debit) generates the limited-duration payment number, which is transmitted via the device's planar coil. The multi-function electronic device of the recipient (e.g., 601 *b*, the card of the user receiving a currency credit) receives the encoded data via the planar coil, acting as an antenna, and the coil interface is able to convert the received signal into a digital signal understood by the processor to be the limited-duration payment number, identifying both the correct account and the amount of the transaction.

In one embodiment, the multi-function electronic device 201 *b* stores cryptocurrency information in processor unit 205. The cryptocurrency information stored is able to include a plurality of cryptocurrency addresses, a plurality of private keys, and a plurality of public keys. The multi-function electronic device 201 *b* is able to perform a transaction, as described above, using a cryptocurrency as the specified account. In one embodiment, the multi-function electronic device 201 *b* is able to hash a portion of the transaction, using the processor unit 205 and the real-time clock 240 along with user information pertinent to the cryptocurrency account and the transaction. A subsequent connection of the device 201 *b* to a computing device provides a means of connecting to the cryptocurrency servers and finalizing the transaction. Further, the multi-function electronic device 201 *b* is able to sign a cryptocurrency transaction by, for instance, receiving a prompt at the display 250 to input a dynamic PIN specific to the transaction, which is able to be entered by touch sensor array 245.

In a device-to-device cryptocurrency exchange, a record of the transaction can be made according to the following. A first device (e.g. 601 *a*) making a deduction with an amount indicated via touch sensor array 245 is able to generate a record of the transaction and store the record in the device memory, while a second device (e.g. 601 *b*) receiving the cryptocurrency is able to generate a confirmation of the received transaction amount. In one embodiment, the amount indicated is provided by the receiving device 601 *b*. The hashed record of the transaction contains the unique information of each user, along with the transaction amount. The success or failure of the transaction is able to be displayed on the respective displays of devices 601 *a* and 601 *b*.

Account Theft and Unintended Use Prevention

A security concern for conventional credit cards utilizing wireless communication means is the ability of a thief to access and/or copy user information through un-detected interaction with the wireless communication means. Sensitive and confidential information can be gleaned via, for example, "listening-in" on an RFID interaction between a credit card and a contactless reader, recording the characteristics of the interaction, and replicating certain characteristics to fake an authorized transaction. While to a great extent security concerns are addressed by the usage of limited-duration payment numbers and other security features provided for by the device of the present disclosure and previously described, a further security feature regarding the wireless communication means of the multi-function electronic device is described herein.

In one embodiment, wireless communication means of the multi-function electronic device 201 *b* are in a powered-down, or disabled, state prior to receiving an authenticated activation signal from a user. Upon receiving the activation signal, the communication means (e.g., NFC 260, RFID 265, and planar coil 220) are activated, enabling the multi-function electronic device 201 *b* to conduct a transaction. The activation signal can originate from one (or a combination) of the set of motion detection units (rate detection 225, optical sensor array 230, and accelerometers 235), the touch sensor array 245, and the galvanic sensor 275. The galvanic sensor 275 is operable to detect a contact of human skin, via a current produced at the sensor 275 upon such contact. See also, for example, FIG. 8. In an embodiment the galvanic sensor 275 is comprised of metallic contacts disposed on opposite sides of, and isolated by, the body of multi-function electronic device 201 *b*. In one embodiment, the current produced by user contact with the galvanic sensor 275 contacts is sufficient to provide small amounts of energy in order to power components of the card. For example, energy produced is able to power the processor unit 205 and the RFID 265. In one embodiment the galvanic sensor 275 further comprises two conducting surfaces separated by a junction, and the galvanic sensor 275 is configured as a thermoelectric generator (e.g., via the Peltier effect, the Seebeck effect, or a combination). For example, heat applied at one surface of the multi-function electronic device 201 *b* may lead to differential heating between the opposing, separated conducting surfaces of the galvanic sensor 275, generating an electric current and powering a subset of, or all of, the components of multi-function electronic device 201 *b* (e.g., the processor unit 205, the NFC 260, and the RFID 265).

In an embodiment, the communication means are activated only so long as the activation signal continues to be detected. In another embodiment, the communication means are activated for a specified amount of time following detection of the activation signal. For example, if using the multi-function electronic device 201 *b* in an ATM (or other device) preventing continuous human contact, the activation signal is able to be a swipe, gesture, or key input sequence entered via the touch sensor array 245, which activates the device for a specified duration (for instance, one minute). In an embodiment the detection of motion through accelerometer input indicates activation by a valid user. In one embodiment the specific motion detected through accelerometer input corresponding with a specific user action, such as a "flick", "swipe", "spin", "wave", "tap," may be used to initiate activation, wherein the motion is not normally generated at idle and during periods of inactivity. For example the motion not being generated accidentally while the device is stored in a user's wallet, carried while the user is actively moving, or is being handed from user to a clerk at a point of transaction. In one embodiment the specific motion, or sequence of motions, may be associated with a user, and stored on the device memory, such that performing the correct sequence when prompted can confirm the possession of the device by the known owner, thus initiating activation and enabling usage.

Figure 7:
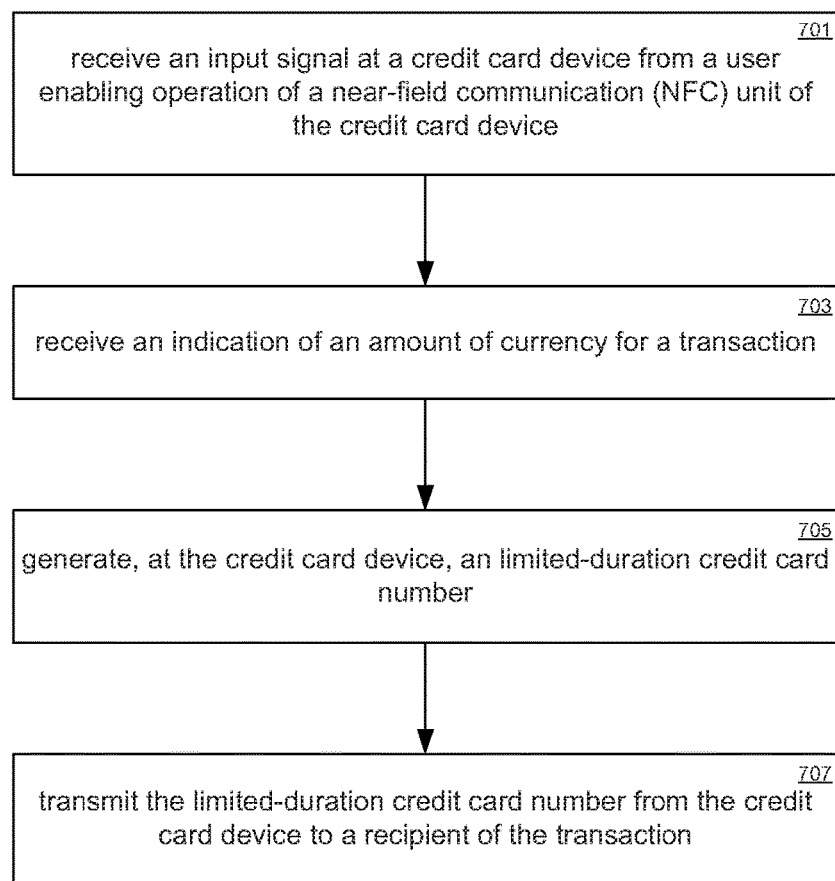
FIG. 7 depicts an exemplary process according to an embodiment of the present disclosure.

FIG. 7 depicts a process of selectively enabling the communication capability of the multi-function electronic device according to an embodiment of the present disclosure. The process 700 begins at step 701, where an input signal is received at the multi-function electronic device from a user. The input signal is able to be generated by any one, or combination, of a plurality of input means, where the input means comprise: a swipe gesture received at a touch sensor array; a key press sequence; an accelerometer sensor indication of multi-function electronic device motion; and a galvanic sensor indication that the device is in a user grasp. The input received from the user enables operation of a near-field communication (NFC) unit of the multi-function electronic device. In one embodiment, the NFC unit is disabled prior to receiving the input signal. In one embodiment, an RFID communication unit is disabled prior to receiving the input signal, and is activated by the input signal. In one embodiment, the planar coil is disabled prior to receiving the input signal, and is activated by the input signal.

The multi-function electronic device, following enablement of the NFC unit, receives an indication of an amount of currency for a transaction at step 703. At step 705, the multi-function electronic device generates a limited-duration payment number, which at step 707 is transmitted to a recipient of the transaction. In one embodiment, the limited-duration payment number has a limited recurrence, and is limited in scope of use to a predetermined number of authorized transactions.

In the foregoing description of process 700, the ordering of the process steps is exemplary and should not be construed as limiting. Alternative ordering of the process steps is consistent with the present disclosure, as conceived by one skilled in the relevant art.

In one embodiment of the present invention, a credit card comprises a dynamic magnetic strip incorporating a main inductor assembly from which magnetic field data symbols are dynamically generated. In one embodiment the inductor assembly may be a planar coil formed within the plastic that the credit card is composed with. The advantage of using a planar coil is that it can produce the same magnetic field interaction that a traditional magnetic strip on a conventional credit card can produce when it is passed through a reader. Similar to a traditional plastic credit card, the planar coil can also produce a magnetic field that can be read by a pickup (or "transducer"). The pickup produces electric current in the coil that, in turn, produces a magnetic field that is read by the pickup. Accordingly, the planar coil can be read in the same way as the magnetic strip on a traditional plastic credit card. The magnetic field produced by the planar coil would behave identically to a traditional magnetic strip.

In one embodiment, alongside the main planar coil, auxiliary rate detection assembly independent of the main inductor assembly would be provided to assist with the alignment of the production of data from the loop as it is being passed over the head of the credit card reader. The reader module of a traditional credit card reader comprises a metal head with a small gap on the tip of the head. This gap is where the pickup armature resides, so that when the metal head passes over the credit card strip, an electric field is induced in the head reader pickup circuit. In one embodiment the auxiliary rate detection assembly is constructed of an array of auxiliary inductor coils and magnetic pickup coils, alongside the main coil. As the metal head of the card reader assembly passes over the arrangement of auxiliary coils and pickup circuits, a disturbance in the magnetic field flowing between the two generates a electrical current change that is detected by a rate detection circuit so as to detect the rate of motion of the card reader head passing across the surface of the card and therefore along the main induction assembly. The purpose of this is to allow the determination of the rate or production of magnetic data symbols in the main inductor assembly to align with the rate at which data is being read by the reader, according to the data density of standard card magnetic strips. Accordingly, it is irrelevant if the credit card of the present invention is being swiped fast or slow, the main inductor assembly produces data at just the right rate depending on the rate at which the card is detected it is being passed over the reader's head.

In one embodiment, a microprocessor is connected to the main coil and the alignment pickups. The microprocessor is responsible for producing the data from the coil at the appropriate rate in accordance with the speed with which the card is swiped through the reader. As shown in FIG. 1, the auxiliary coil detects the rate at which the credit card is being swiped. The microprocessor then uses this information to produce the data from the main planar coil at the appropriate rate for the credit card reader.

In addition, the credit card of the present invention comprises a real time clock that can produce a cryptographically worthy timestamp for each interaction and a battery back up that can be used to power up the microprocessor. Further, the card can comprise additional human inputs, e.g., touch sensors which can be formed by contacts that a user can press. For example, there can be contacts that a user can press to wake up the card, to cause the battery to supply power, or to put the card to sleep when it is not being used. There can also be additional inputs to key in customer specific information. For example, there can be inputs to key in a password or any other kind of unique identifier. If any other number besides the password is entered multiple times, or if there is attempted usage of the card without entering in a password, an automatic phone call may be triggered to the appropriate fraud protection authorities.

In one embodiment, the number on the front of the card can be a full or partial number. The number may not have to necessarily be a static number. For example, the first four and last four digits of the card number can be fixed while the remaining eight can be dynamically generated. As the credit card is read by the machine, part or all of the number may be dynamically produced at the time the card is read. The dynamic part of the number generated may be based on the user's private information, the user's bank information, the time of day or the facility that is reading the card. Further, the expiration date of the card can also be dynamically generated. Effectively, a credit card can be created that has no fixed number and therefore cannot be stolen. Only the number generated at the instant the card is being used matters. Accordingly, unauthorized use of the card is nearly impossible because no transaction can be conducted with only the partial static part of the payment number. In one embodiment of the present invention, enough dynamically generated numbers are provided for on the credit card such that a unique payment number can be generated for each transaction. In this embodiment, the credit card of the present invention effectively acts as a unique per transaction credit card.

In embodiments of the present invention comprising dynamically created payment numbers, a single credit card can be used for multiple banks. For example, instead of carrying a separate credit card for all the different credit card companies, a customer would only need to carry a single card and one of the inputs on the front of the card can be used to select the appropriate bank or credit provider.

In one embodiment of the present invention, a thin film liquid crystal display ("LCD") can be fitted on the card so the credit card can have a display screen. The display can have multiple uses. In one embodiment, the display can be used to ask the user a security question if an improper password is entered. Or if the fraud protection services need to contact a customer, they can verify the customer's identity by transmitting a security question to the user's credit card screen to which the user would then need to respond correctly using the input buttons on the card.

In one embodiment, the credit card of the present invention could also be used to make online purchases. In this embodiment, the card could use RFID or near field technology so that it can connect to a personal computer and be used to uniquely generate a payment number for online purchases. The number could also, in one embodiment, be displayed on the front LCD of the card. In one embodiment, the card may also be equipped with a means for communicating with the USB port on the computer in connection with making the online purchases.

Table 1

An apparatus for conducting credit transactions comprising:
- a device with the similar dimensions and thickness to a standard credit card
- an inductor assembly integrated into said device capable of generating a programmed magnetic field at a location on the device where it will come into proximity to a standard credit card magnetic-strip reader the inductor assembly being operable to be read by a magnetic pickup of an electronic credit card reader;
- at least one auxiliary rate detection units adjacent to said inductor assembly,
- wherein said at least one auxiliary detection unit is operable to detect a rate at which said device, including said inductor assembly, is passed through said electronic credit card reader; and
- a microprocessor operatively coupled to said inductor assembly and said at least one detection unit, wherein said microprocessor is operable to simulate magnetic-strip data fields using the inductor assembly, at a rate determined from said auxiliary detection units.

2. A method of claim 1, wherein the inductor assembly is a planar coil which is a looped inductor with dimension roughly equal to, and along the axis of, the standard credit-card magnetic strip 3. A method of claim 1, wherein said detection assembly consists of a plurality of motion rate detection units, which may comprise inductor coils and companion magnetic-field pickup coils, each of which is able to detect the proximity of metallic objects, such as magnetic-strip reader heads, passing through the magnetic field created by said inductor and detected by said pickup coil.

4. A method of claim 1, wherein said device may incorporate a plurality of touch sensors arranged along the surface of said device which may:
   allow user input of information,
   allow introducing a transaction specific identifier,
   to confirm/deny transaction information,
   to operate in sequence, or with a gesture across said sensor for the purpose
   lock/unlock or control access for transactions 5. A method of claim 4, wherein said device contains a real-time clock or counter unit which generates a sequential parameter when the card is read by said credit card reader, and which along with certain user information, transaction identifiers, user secrets, payment authority secrets is combined to generate a limited-use payment number, which has a limited recurrence, is limited in scope of use to a predetermined number of authorized transactions 6. A method of claim 5, wherein the time, sequence, user, payment authority and other information is similarly combined by credit card processing facility to generate a payment number for comparison to the number transmitted by the credit card reader, for the purposes of authenticating said number is from a recognized card used in a user-authorized transaction 7. A method of claim 1, wherein said device incorporates a display allowing payment number, time, passcodes, sequence codes, amounts and other credit card transaction information to be displayed for user, merchant, bank or credit card authority 8. An Apparatus for conducting credit transactions comprising, wherein the edge of said device contains a connector for connection to standard computing devices such as a USB interface.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

I claim:

1. A payment processing facility, comprising at least one electronic computing server device, wherein said server device is configured to:
   receive an electronic payment request including a first information from a payment transaction,
   wherein said payment transaction originates from a multi-function electronic device performing said payment transaction at a merchant's payment facility;
   determine a user, and an original payment issuer authority account information from said first information from said payment transaction;
   dynamically generate, at the server device, an authentic limited-use payment information;
   generate a comparison of said authentic limited-use payment information against at least a portion of the first information received in the payment transaction;
   reject as invalid the payment transaction failing said comparison or authorize as valid the payment transaction responsive to a successful said comparison; and
   wherein further, said authentic limited-use payment information is dynamically generated based on combining one or more limiting factors, selected from a set of limiting factors, consisting of:
   a unique-per-user user-identifying parameter,
   a unique-per-merchant merchant-identifying parameter,
   a unique-per-multi-function-electronic-device device-identifying parameter,
   a unique-per-issuer payment-issuer-authority-identifying parameter,
   a unique-per-multi-function-electronic-device device account number,
   a time-limit duration parameter,
   a usage count parameter,
   a recurrent usage-limit parameter,
   a balance amount parameter,
   a transaction amount parameter,
   a transaction amount limit parameter,
   an aggregate amount limit parameter,
   a transaction recurrence parameter,
   a transaction recurrence limit parameter,
   a per-transaction sequential count parameter; and
   wherein selection of said one or more limiting factors is similarly combined by the payment processing facility, as were combined within the multi-function electronic device when dynamically generating the first information;
   wherein said server device determines an original payment issuer authority information from a static portion of the authentic limited-use payment information, that is associated with a user selected payment account associated with the first information; and
   responsive to the comparison, send a status reflecting authorization or rejection of the payment transaction, to an original payment issuer authority.

2. The payment processing facility of claim 1, wherein the server device is further configured to:
   determine, from said information from said payment transaction, a specific multi-function electronic device performing said payment transaction; and
   determine a valid set of limiting factors to be used for validating payment transactions generated from said specific multi-function electronic device.

3. The payment processing facility of claim 1, wherein the server device is further configured to:
   determine, from said information from said payment transaction, a specific user performing said payment transaction; and
   determine a valid set of limiting factors to be used for validating payment transactions performed by said specific user.

4. The payment processing facility of claim 1, wherein the server device is further configured to:
   determine from the information received in the payment transaction, a specific merchant where said payment transaction is directed; and
   determine a valid set of limiting factors to be used for validating payment transactions generated for payment to said specific merchant.

5. The payment processing facility of claim 1, wherein the server device is further configured to:
   determine from said information from said payment transaction, a device account number used in performing said payment transaction;
   determine from said device account number, a specific multi-function electronic device used in performing said payment transaction; and
   determine a valid set of limiting factors to be used for validating payment transactions generated from said specific multi-function electronic device.

6. The payment processing facility of claim 1, wherein the server device is further configured to:
   determine from said first information from said payment transaction, a merchant account number used in performing said payment transaction;
   determine from said merchant account number, a specific user-identifier from whom the payment transaction originated, and a specific merchant-identifier for whom said payment transaction was intended; and
   determine a valid set of limiting factors to be used for validating payment transactions generated from said specific user-identifier for said specific merchant-identifier.

7. A computer implemented method performed by a payment processing facility, comprising at least one computing device to processes electronic payment requests, said method comprising:

receiving an electronic payment request including a first information from a payment transaction, wherein said payment transaction originates from said payment transaction at a merchant's payment facility;

determining a user, and an original payment issuer authority account information from said first information from said payment transaction;

dynamically generating an authentic limited-use payment information;

generating a comparison of said authentic limited-use payment information against at least a portion of the first information received in the payment transaction;

rejecting as invalid a payment transaction failing said comparison and otherwise authorizing as valid a payment transaction succeeding said comparison, and wherein further, said authentic limited-use payment information is dynamically generated based on combining one or more limiting factors, selected from a set of limiting factors, consisting of:

a unique-per-user user-identifying parameter, a unique-per-merchant merchant-identifying parameter, a unique-per-multi-function-electronic-device device-identifying parameter, a unique-per-issuer payment-issuer-authority-identifying parameter, a unique-per-multi-function-electronic-device device account number, a time-limit duration parameter, a usage count parameter, a recurrent usage-limit parameter, a balance amount parameter, an aggregate amount limit parameter, a transaction amount parameter, a transaction amount limit parameter, a transaction recurrence parameter, a transaction recurrence limit parameter, and a per-transaction sequential count parameter; and wherein selection of said one or more limiting factors is determined by said at least one computing device to have been combined within a multi-function electronic device when dynamically generating the first information, and said at least one computing device determining an original payment issuer authority information from a static portion of the authentic limited-use payment information, that is associated with a user selected payment account associated with the payment transaction; and responsive to the comparison, sending a status reflecting authorizing or rejecting of the payment transaction, to an original payment issuer authority.

8. The method of claim 7, further comprising:

determining, from said information from said payment transaction, a specific multi-function electronic device performing said payment transaction; and determining a valid set of limiting factors to be used for validating payment transactions generated from said specific multi-function electronic device.

9. The method of claim 7, further comprising:

determining, from said information from said payment transaction, a specific user, performing said payment transaction; and determining a valid set of limiting factors to be used for validating payment transactions performed by said specific user.

10. The method of claim 7, further comprising:

determining from the information received in the payment transaction, a specific merchant where said payment transaction is directed; and determining a valid set of limiting factors to be used for validating payment transactions generated for payment to said specific merchant.

11. The method of claim 7, further comprising:

determining from said information from said payment transaction, a device account number used in performing said payment transaction;

determining from said device account number, a specific multi-function electronic device used in performing said payment transaction; and determining a valid set of limiting factors to be used for validating payment transactions generated from said specific multi-function electronic device.

12. The method of claim 7, further comprising:

determining from said first information from said payment transaction, a merchant account number used in performing said payment transaction;

determining from said merchant account number, a specific user-identifier from whom the payment transaction originated, and a specific merchant-identifier for whom said payment transaction was intended; and determining a valid set of limiting factors to be used for validating payment transactions generated from said specific user-identifier for said specific merchant-identifier.

13. A non-transitory computer-readable medium having instructions stored thereon that, responsive to execution by an electronic computing device which processes electronic payment requests, cause said electronic computing device to perform a method comprising:

receiving an electronic payment request including a first information from a payment transaction, wherein said payment transaction originates from a multi-function electronic device performing said payment transaction at a merchant's payment facility;

determining a user, and an original payment issuer authority account information from said first information from said payment transaction;

dynamically generating an authentic limited-use payment information;

generating a comparison of said authentic limited-use payment information against at least a portion of the first information received in the payment transaction;

rejecting as invalid a payment transaction failing said comparison and otherwise authorizing as valid a payment transaction succeeding said comparison, and wherein further, said authentic limited-use payment information is dynamically generated based on combining one or more limiting factors, selected from a valid set of limiting factors; and wherein said one or more limiting factors were combined within the multi-function electronic device when dynamically generating the payment transaction, and said electronic computing device determining an original payment issuer authority information from a static portion of the authentic limited-use payment information, that is associated with a user selected payment account used in the payment transaction; and responsive to the comparison, sending a status reflecting authorizing or rejecting of the payment transaction, to an original payment issuer authority.

14. The method of claim 13, further comprising:
determining, from said first information from said payment transaction, an identifying parameter of a specific multi-function electronic device performing said payment transaction; and
determining the valid set of limiting factors to be used for validating payment transactions generated from said specific multi-function electronic device.

15. The method of claim 14 wherein said valid set of limiting factors, is a set consisting of at least one or more of:
a unique-per-user user-identifying parameter,
a unique-per-merchant merchant-identifying parameter,
a unique-per-multi-function-electronic-device device-identifying parameter,
a unique-per-issuer payment-issuer-authority-identifying parameter,
a unique-per-multi-function-electronic-device device account number,
a time-limit duration parameter,
a usage count parameter,
a recurrent usage-limit parameter,
a balance amount parameter,
an aggregate amount limit parameter,
a transaction amount parameter,
a transaction amount limit parameter,
a transaction recurrence parameter,
a transaction recurrence limit parameter, and
a per-transaction sequential count parameter.

16. The method of claim 13, further comprising:
determining, from said first information from said payment transaction, an identifying parameter of a specific user, performing said payment transaction; and
determining the valid set of limiting factors to be used for validating payment transactions performed by said specific user.

17. The method of claim 16 wherein said valid set of limiting factors, is a set consisting of at least one or more of:
a unique-per-user user-identifying parameter,
a unique-per-merchant merchant-identifying parameter,
a unique-per-multi-function-electronic-device device-identifying parameter,
a unique-per-issuer payment-issuer-authority-identifying parameter,
a unique-per-multi-function-electronic-device device account number,
a time-limit duration parameter,
a usage count parameter,
a recurrent usage-limit parameter,
a balance amount parameter,
an aggregate amount limit parameter,
a transaction amount parameter,
a transaction amount limit parameter,
a transaction recurrence parameter,
a transaction recurrence limit parameter, and
a per-transaction sequential count parameter.

18. The method of claim 13, further comprising:
determining from the first information received in the payment transaction, an identifying parameter of a specific merchant where said payment transaction is directed; and
determining the valid set of limiting factors to be used for validating payment transactions generated for payment to said specific merchant.

19. The method of claim 18 wherein said valid set of limiting factors, is a set consisting of at least one or more of:
a unique-per-user user-identifying parameter,
a unique-per-merchant merchant-identifying parameter,
a unique-per-multi-function-electronic-device device-identifying parameter,
a unique-per-issuer payment-issuer-authority-identifying parameter,
a unique-per-multi-function-electronic-device device account number,
a time-limit duration parameter,
a usage count parameter,
a recurrent usage-limit parameter,
a balance amount parameter,
an aggregate amount limit parameter,
a transaction amount parameter,
a transaction amount limit parameter,
a transaction recurrence parameter,
a transaction recurrence limit parameter, and
a per-transaction sequential count parameter.

20. The method of claim 13, further comprising:
determining from said first information from said payment transaction, a device account number used in performing said payment transaction;
determining from said device account number, an identifying parameter of a specific multi-function electronic device used in performing said payment transaction; and
determining the valid set of limiting factors to be used for validating payment transactions generated from said specific multi-function electronic device.

21. The method of claim 20 wherein said valid set of limiting factors, is a set consisting of at least one or more of:
a unique-per-user user-identifying parameter,
a unique-per-merchant merchant-identifying parameter,
a unique-per-multi-function-electronic-device device-identifying parameter,
a unique-per-issuer payment-issuer-authority-identifying parameter,
a unique-per-multi-function-electronic-device device account number,
a time-limit duration parameter,
a usage count parameter,
a recurrent usage-limit parameter,
a balance amount parameter,
an aggregate amount limit parameter,
a transaction amount parameter,
a transaction amount limit parameter,
a transaction recurrence parameter,
a transaction recurrence limit parameter, and
a per-transaction sequential count parameter.

22. The method of claim 13, further comprising:
determining from said first information from said payment transaction, an identifying parameter of a merchant used in performing said payment transaction;
determining from said identifying parameter of said merchant, a specific user-identifier from whom the payment transaction originated, and a specific merchant-identifier for whom said payment transaction was intended; and
determining the valid set of limiting factors to be used for validating payment transactions generated from said specific user-identifier for said specific merchant-identifier.

23. The method of claim 22 wherein said valid set of limiting factors, is a set consisting of at least one or more of:
a unique-per-user user-identifying parameter, a unique-per-merchant merchant-identifying parameter,
a unique-per-multi-function-electronic-device device-identifying parameter,
a unique-per-issuer payment-issuer-authority-identifying parameter,
a unique-per-multi-function-electronic-device device account number,
a time-limit duration parameter,
a usage count parameter,
a recurrent usage-limit parameter,
a balance amount parameter,
an aggregate amount limit parameter,
a transaction amount parameter,
a transaction amount limit parameter,
a transaction recurrence parameter,
a transaction recurrence limit parameter, and
a per-transaction sequential count parameter.

* * * * *